(12) United States Patent
Lee et al.

(10) Patent No.: US 12,493,373 B2
(45) Date of Patent: Dec. 9, 2025

(54) DISPLAY DEVICE

(71) Applicant: Samsung Display Co., Ltd., Yongin-Si (KR)

(72) Inventors: Seung Chan Lee, Yongin-si (KR); Sung Kyun Park, Yongin-si (KR); Cheol Ku Kang, Yongin-si (KR); Ki Cheol Kim, Yongin-si (KR); Dong Hee Choi, Yongin-si (KR); Do Yeon Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/882,434

(22) Filed: Sep. 11, 2024

(65) Prior Publication Data

US 2025/0264949 A1    Aug. 21, 2025

(30) Foreign Application Priority Data

Feb. 20, 2024  (KR) .................. 10-2024-0024396

(51) Int. Cl.
  *G06F 3/041*  (2006.01)
  *G06F 3/044*  (2006.01)
(52) U.S. Cl.
  CPC ........ *G06F 3/0412* (2013.01); *G06F 3/04164* (2019.05); *G06F 3/0445* (2019.05); *G06F 3/0446* (2019.05)
(58) Field of Classification Search
  CPC .... G06F 3/0412; G06F 3/0445; G06F 3/0446; G06F 3/04164
  See application file for complete search history.

(56) References Cited

U.S. PATENT DOCUMENTS

| | | |
|---|---|---|
| 10,732,775 B2 | 8/2020 | Kim et al. |
| 11,093,065 B2 | 8/2021 | Kim et al. |
| 11,429,211 B2 | 8/2022 | Kim et al. |
| 2021/0200415 A1* | 7/2021 | Jun .......................... G09G 3/20 |

FOREIGN PATENT DOCUMENTS

| | | |
|---|---|---|
| KR | 10-2021-0080674 A | 7/2021 |
| KR | 10-2508964 B1 | 3/2023 |

* cited by examiner

*Primary Examiner* — Deeprose Subedi
(74) *Attorney, Agent, or Firm* — Innovation Counsel LLP

(57) ABSTRACT

A display device is provided. The display device includes a substrate including a touch sensing area and a touch peripheral area disposed near the touch sensing area; a circuit layer disposed on the substrate; a touch sensor layer disposed on the circuit layer, including N number of touch sensing electrodes arranged in the touch sensing area in a first direction and a second direction, and N number of sensing transfer lines electrically connected to the N number of touch sensing electrodes, respectively; a multiplexer disposed in the touch peripheral area and electrically connected between the N number of sensing transfer lines and a touch driving circuit; and an electrostatic shielding layer overlapping with the multiplexer. The N number of sensing transfer lines extend from the N number of touch sensing electrodes to the multiplexer. Among the N number of sensing transfer lines, 2M number of sensing transfer lines selected by the multiplexer are electrically connected to the touch driving circuit. Each of N and M is a natural number and M is smaller than N.

20 Claims, 18 Drawing Sheets

MT:MT1,MT2,MT3,MT4

DISPLAY DEVICE

CROSS-REFERENCE TO RELATED APPLICATION

This application claims priority from Korean Patent Application No. 10-2024-0024396 filed on Feb. 20, 2024, in the Korean Intellectual Property Office and all the benefits accruing therefrom under 35 U.S.C. 119, the contents of which in its entirety are herein incorporated by reference.

BACKGROUND

Technical Field

The present disclosure relates to a display device.

Description of the Related Art

With advancement of information age, demand for display devices has increased. For example, demand for display devices applied to various electronic devices such as smart phones, digital cameras, laptop computers, navigators and smart televisions has been increasing.

A display device may be a flat panel display device such as a liquid crystal display device, a field emission display device and a light emitting display device. In this case, the light emitting display device may include an organic light emitting display device including an organic light emitting element, an inorganic light emitting display device including an inorganic light emitting element such as an inorganic semiconductor, and a micro light emitting display device including a micro light emitting element.

The organic light emitting display device displays an image by using light emitting elements, each of which includes a light emitting layer of an organic light emitting material. As the organic light emitting display device implements image display by using a self-light emitting element, the organic light emitting display device may have relatively excellent performance in view of power consumption, response speed, light emitting efficiency, luminance and wide viewing angle as compared with other display devices.

One surface of the display device may be a display surface that includes a display area in which an image is displayed. Light emission areas for emitting light with each luminance and color may be arranged in the display area.

SUMMARY

The display device may further include touch sensing electrodes for sensing a touch on a screen, thereby providing a touch sensing function for sensing a user's input through contact with the screen as well as a function of displaying an image.

The display device may further include sensing transfer lines electrically connecting the touch sensing electrodes with a touch driving circuit.

In order to improve sensitivity and accuracy of touch sensing, the sensing transfer lines may be electrically connected to respective ones of the touch sensing electrodes. In this case, the number of sensing transfer lines is increased to match the number of the touch sensing electrodes, the number of signal terminals of the touch driving circuit ends up being less than the number of sensing transfer lines. To solve this mismatch between the number of signal terminals of the touch driving circuit and the number of sensing transfer lines, when the number of touch driving circuits is increased, manufacturing cost of the display device may be undesirably increased.

An object of the present disclosure is to provide a display device that includes sensing transfer lines electrically connected to touch sensing electrodes, respectively, and maintains the number of touch driving circuits to prevent manufacturing cost from increasing.

The objects of the present disclosure are not limited to those mentioned above and additional objects of the present disclosure, which are not mentioned herein, will be clearly understood by those skilled in the art from the following description of the present disclosure.

According to an aspect of the present disclosure, there is provided a display device comprises a substrate including a touch sensing area and a touch peripheral area disposed near the touch sensing area; a circuit layer disposed on the substrate; a touch sensor layer disposed on the circuit layer, including N number of touch sensing electrodes arranged in the touch sensing area in a first direction and a second direction, and N number of sensing transfer lines electrically connected to the N number of touch sensing electrodes, respectively; a multiplexer disposed in the touch peripheral area and electrically connected between the N number of sensing transfer lines and a touch driving circuit; and an electrostatic shielding layer overlapping with the multiplexer. The N number of sensing transfer lines extend from the N number of touch sensing electrodes to the multiplexer. Among the N number of sensing transfer lines, 2M number of sensing transfer lines selected by the multiplexer are electrically connected to the touch driving circuit. Each of N and M is a natural number and M is smaller than N.

The multiplexer includes a first MUX unit for selecting a first set of M sensing transfer lines among the N sensing transfer lines; a second MUX unit for transferring a sensing signal of a first subset of the first set of M number of sensing transfer lines selected by the first MUX unit to the touch driving circuit; and a third MUX unit for transferring a driving signal to a second set of M sensing transfer lines among the N sensing transfer lines, wherein the first set and the second set of M sensing transfer lines are different. The second MUX unit transfers the driving signal to a second subset of the first set of sensing transfer lines.

Each of the first MUX unit, the second MUX unit and the third MUX unit may include M number of channels. The M number of channels select mutually exclusive sensing transfer lines of the N number of sensing transfer lines.

The first MUX unit may include N number of first MUX transistors electrically connected to the N number of sensing transfer lines, respectively. The second MUX unit may include M number of second MUX transistors and M number of third MUX transistors, which are electrically connected to M number of sensing transfer lines selected by the first MUX unit. The third MUX unit may include N number of fourth MUX transistors electrically connected to the N number of sensing transfer lines, respectively. The multiplexer may further include a first line portion including lines electrically connected to the N number of first MUX transistors and arranged to be adjacent to each other; a second line portion including lines electrically connected to the M number of second MUX transistors and the M number of third MUX transistors and arranged to be adjacent to each other; and a third line portion including lines electrically connected to the N number of third MUX transistors and arranged to be adjacent to each other.

The touch sensor layer may include: a touch buffer layer disposed on the circuit layer; a first touch conductive layer disposed on the touch buffer layer; a touch interlayer insulating layer covering the first touch conductive layer; a second touch conductive layer disposed on the touch interlayer insulating layer; and a touch planarization layer covering the second touch conductive layer. The electrostatic shielding layer may be disposed as the second touch conductive layer on the touch interlayer insulating layer.

The N number of touch sensing electrodes may be disposed as the first touch conductive layer and spaced apart from each other. The N number of sensing transfer lines may be disposed as the second touch conductive layer and spaced apart from each other.

The circuit layer may include an interlayer insulating layer disposed on the substrate; and a planarization layer covering a source drain conductive layer on the interlayer insulating layer. The interlayer insulating layer may cover the N number of first MUX transistors, the M number of second MUX transistors, the M number of third MUX transistors and the N number of fourth MUX transistors. The lines of each of the first line portion, the second line portion and the third line portion are disposed as the source drain conductive layer.

The electrostatic shielding layer may extend toward an edge of the substrate, covers a side of each of the touch interlayer insulating layer and the planarization layer, and is in contact with the interlayer insulating layer.

The circuit layer may further include a ground line disposed to be adjacent to an edge of the substrate, transferring a ground power source. The electrostatic shielding layer is electrically connected to the ground line.

The electrostatic shielding layer may extend toward the edge of the substrate, covers a side of each of the touch interlayer insulating layer and the planarization layer, and is in contact with the interlayer insulating layer.

The circuit layer further includes a ground connection electrode overlapping with the ground line and the electrostatic shielding layer and disposed as the source drain conductive layer. The ground connection electrode may be electrically connected to the ground line through a hole passing through the interlayer insulating layer, and is electrically connected to the electrostatic shielding layer through a hole extending through the planarization layer and the touch interlayer insulating layer.

The circuit layer may further include an electrostatic shielding auxiliary layer disposed on the substrate and overlapping the multiplexer and the electrostatic shielding layer; and a buffer layer covering the electrostatic shielding auxiliary layer. The interlayer insulating layer may be disposed on the buffer layer.

The electrostatic shielding layer may extend toward an edge of the substrate, cover a side of each of the touch interlayer insulating layer and the planarization layer, and is in contact with the interlayer insulating layer.

The circuit layer may further include a ground line disposed to be adjacent to the edge of the substrate, transferring a ground power source. The electrostatic shielding layer may be electrically connected to the ground line.

The display device may further include transmissive holes extending through the electrostatic shielding layer to the touch interlayer insulating layer. The transmissive holes overlap the first line portion, the second line portion and the third line portion, and are spaced apart from the N number of first MUX transistors, the M number of second MUX transistors, the M number of third MUX transistors and the N number of fourth MUX transistors.

According to an aspect of the present disclosure, there is provided a display device comprises a substrate including a touch sensing area and a touch peripheral area disposed near the touch sensing area; a circuit layer disposed on the substrate; a touch sensor layer disposed on the circuit layer, including N number of touch sensing electrodes arranged in the touch sensing area in a first direction and a second direction, and N number of sensing transfer lines electrically connected to the N number of touch sensing electrodes, respectively; a multiplexer disposed in the touch peripheral area and electrically connecting the N number of sensing transfer lines to a touch driving circuit; and an electrostatic shielding layer overlapping with the multiplexer. The N number of sensing transfer lines may extend from the N number of touch sensing electrodes to the multiplexer. Among the N number of sensing transfer lines, 2M number of sensing transfer lines selected by the multiplexer are electrically connected to the touch driving circuit. Each of N and M is a natural number and M is smaller than N. The touch sensor layer includes a touch buffer layer disposed on the circuit layer; a first touch conductive layer disposed on the touch buffer layer; a touch interlayer insulating layer covering the first touch conductive layer; a second touch conductive layer disposed on the touch interlayer insulating layer; and a touch planarization layer covering the second touch conductive layer. The electrostatic shielding layer is disposed as the second touch conductive layer on the touch interlayer insulating layer.

The multiplexer may include a first MUX unit including N MUX transistors electrically connected to the N sensing transfer lines, respectively, and selecting a first set of M sensing transfer lines among the N sensing transfer lines; a second MUX unit including 2M number of MUX transistors electrically connected to the first set of M sensing transfer lines and transferring a sensing signal of a first subset of the first set of M sensing transfer lines to the touch driving circuit; a third MUX unit including N number of MUX transistors electrically connected to the N number of sensing transfer lines, respectively, and transferring a driving signal to a second set of M sensing transfer lines among the N sensing transfer lines; a first line portion including lines electrically connected to the N number of MUX transistors of the first MUX unit and arranged to be adjacent to each other; a second line portion including lines electrically connected to the 2M number of MUX transistors of the second MUX unit and arranged to be adjacent to each other; and a third line portion including lines electrically connected to the N number of MUX transistors of the third MUX unit and arranged to be adjacent to each other. The second MUX unit transfers the driving signal to a second subset of the first set of sensing transfer lines.

The circuit layer may include an interlayer insulating layer disposed on the substrate; and a planarization layer covering a source drain conductive layer on the interlayer insulating layer. The interlayer insulating layer may cover the MUX transistors of the multiplexer. The lines of each of the first line portion, the second line portion and the third line portion may be disposed as the source drain conductive layer. The electrostatic shielding layer may extend toward an edge of the substrate, cover a side of each of the touch interlayer insulating layer and the planarization layer, and contact the interlayer insulating layer.

The circuit layer may further include a ground line disposed to be adjacent to the edge of the substrate, transferring a ground power source. The electrostatic shielding layer may be electrically connected to the ground line.

The circuit layer may further include an electrostatic shielding auxiliary layer disposed on the substrate and overlapping with the multiplexer and the electrostatic shielding layer; and a buffer layer covering the electrostatic shielding auxiliary layer. The interlayer insulating layer may be disposed on the buffer layer. The electrostatic shielding auxiliary layer may be electrically connected to the ground line.

A display device according to the embodiments includes a multiplexer electrically connected to N number of touch sensing electrodes and a touch driving circuit.

The multiplexer is disposed in a touch peripheral area, selects 2M number of sensing transfer lines among N number of sensing transfer lines electrically connected to the N number of touch sensing electrodes, respectively, and electrically connects the selected 2M number of sensing transfer lines to the touch driving circuit. In this case, M is smaller than N, and M and N are natural numbers.

In this case, even though the touch driving circuit includes 2M number of signal terminals (2M<N), electrical connection between the 2M number of sensing transfer lines selected by the multiplexer among the N number of sensing transfer lines and the touch driving circuit may be implemented. That is, the number of signal terminals of the touch driving circuit may be 2M wherein 2M<N, instead of N respectively corresponding to the N number of sensing transfer lines. Therefore, even though the N number of sensing transfer lines electrically connected to the N touch sensing electrodes are provided, since it is not necessary to increase the number of touch driving circuits, the manufacturing cost of the display device may not be significantly increased.

Meanwhile, the multiplexer may include transistors electrically connected to the N number of sensing transfer lines, and transistors electrically connected to the 2M number of signal terminals. That is, as the multiplexer includes a relatively large number of transistors, the multiplexer may be vulnerable to the inflow of static electricity.

To reduce the possible inflow of static electricity to the multiplexer, the display device according to the embodiments may include an electrostatic shielding layer overlapping with the multiplexer.

The electrostatic shielding layer may reduce or prevent any damage to transistors of the multiplexer that would be caused by static electricity, thereby improving the accuracy and reliability of a touch sensing function provided by the display device. The lifespan of the display device may also be improved.

The effects according to the embodiments of the present disclosure are not limited to those mentioned above and more various effects are included in the following description of the present disclosure.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE DISCLOSURE

Figure 1:
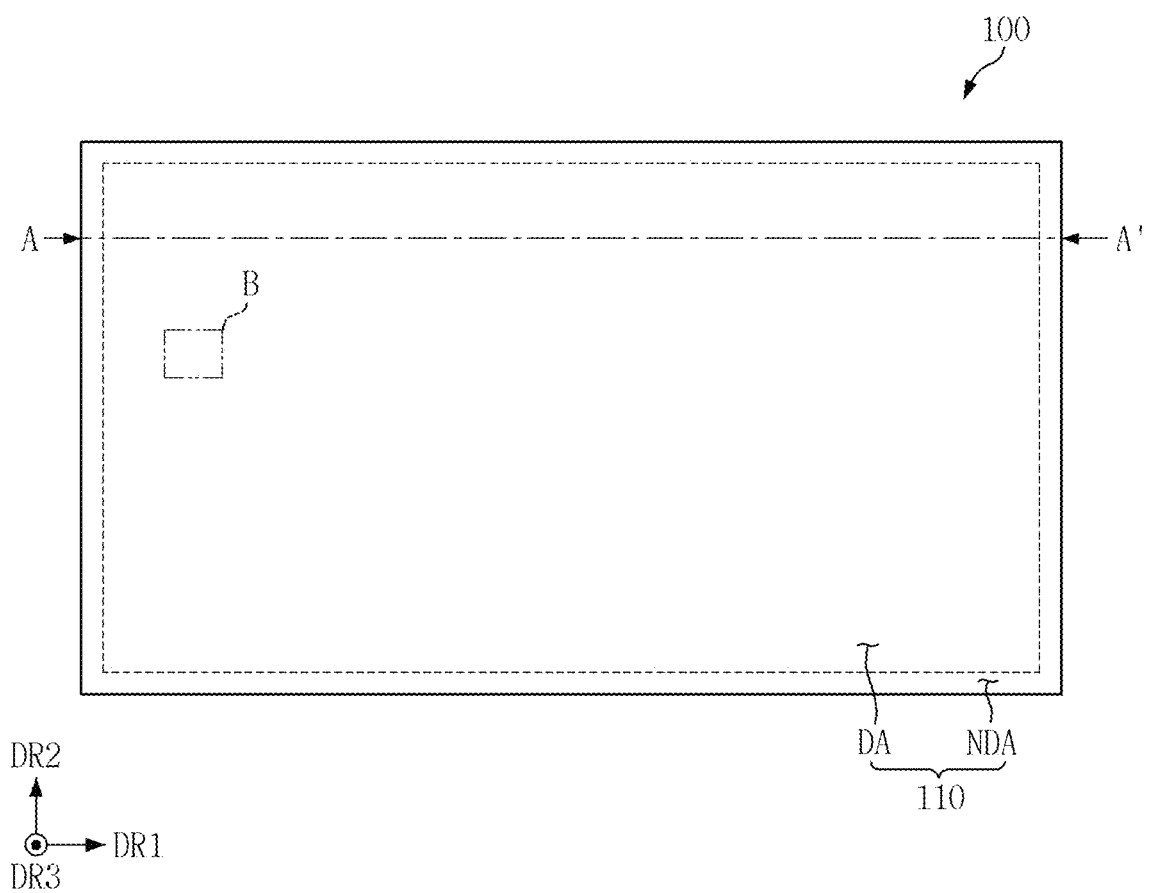
FIG. 1 is a plan view illustrating a display device according to the embodiments.

The embodiments will now be described more fully with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means an object portion is viewed from above, and the phrase "in a schematic cross-sectional view" means a schematic cross-section taken by cutting an object portion is viewed from the cut surface. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may mean "spaced apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited to any order or priority by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within +30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described with reference to the accompanying drawings.

Figure 2:
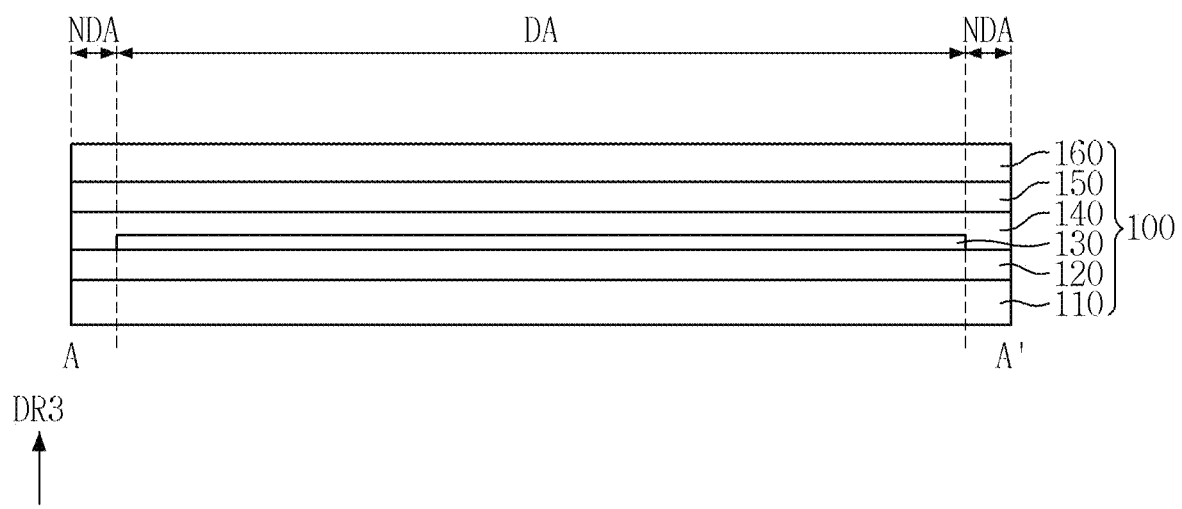
FIG. 2 is a cross-sectional view illustrating A-A' of FIG. 1.
Figure 3:
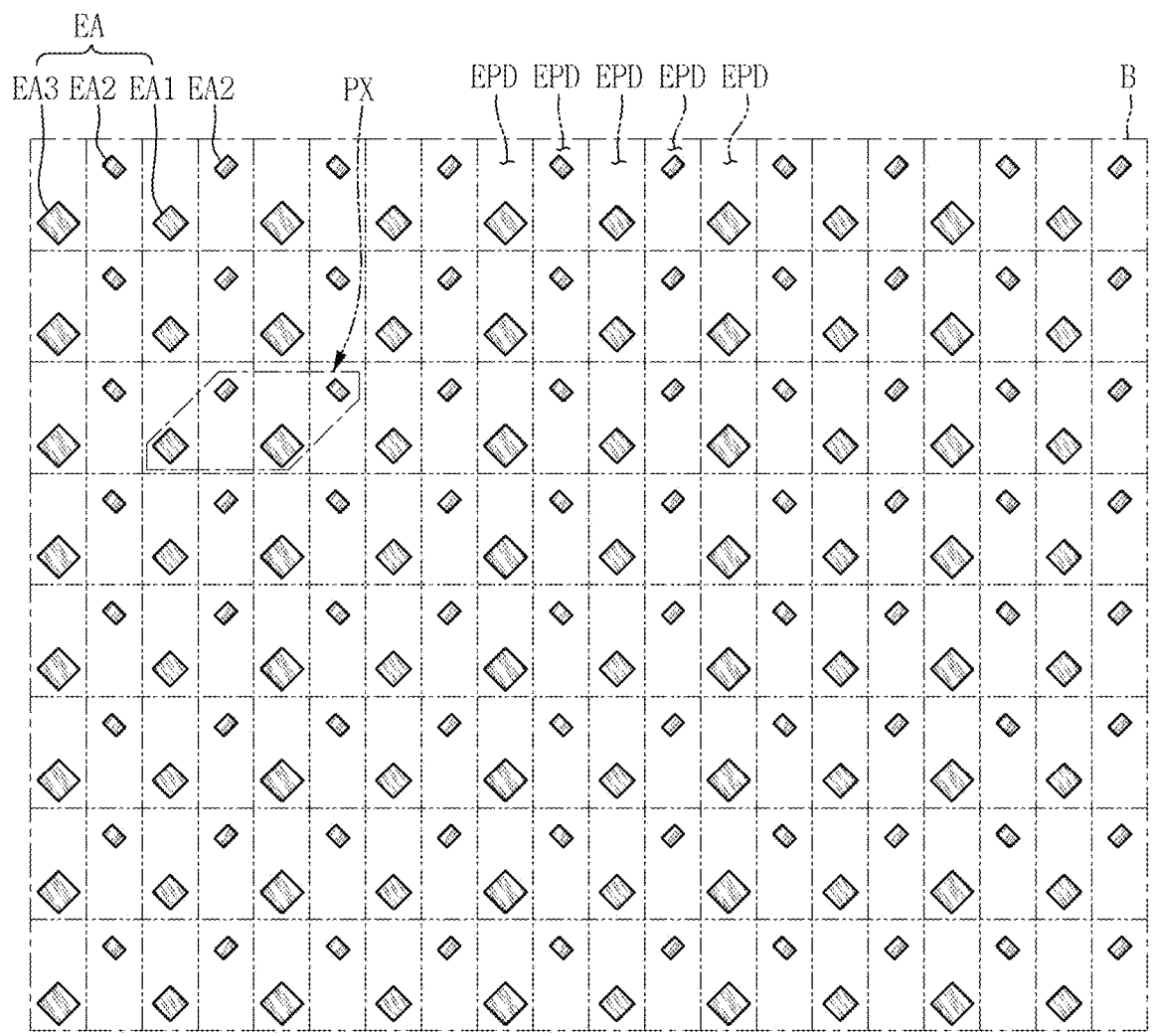
FIG. 3 is a layout view illustrating a portion B of FIG. 1.

FIG. 1 is a plan view illustrating a display device according to the embodiments. FIG. 2 is a cross-sectional view illustrating A-A' of FIG. 1. FIG. 3 is a layout view illustrating a portion B of FIG. 1.

Referring to FIG. 1, a display device 100 is a device that displays a moving image or a still image, and may be used as a display screen of various products such as a television, a laptop computer, a monitor, an advertising board and a device for Internet of things (IoT) as well as portable electronic devices such as a mobile phone, a smart phone, a tablet personal computer (PC), a smart watch, a watch phone, a mobile communication terminal, an electronic diary, an electronic book, a portable multimedia player (PMP), a navigator and an ultra mobile PC (UMPC).

The display device 100 may be a light emitting display device such as an organic light emitting display device using an organic light emitting diode, a quantum dot light emitting display device including a quantum dot light emitting layer, an inorganic light emitting display device including an inorganic semiconductor and a micro light emitting display device using a micro or nano light emitting diode (micro LED or nano LED). The following description will be based on that the display device 100 is an organic light emitting display device, but the present disclosure is not limited thereto. The present disclosure may be applied to a display device that includes an organic insulating material, an organic light emitting material and a metal material.

The display device 100 may be flat, but is not limited to being flat. For example, the display device 100 may include a curved portion formed at left and right ends, having a constant curvature or a variable curvature. In addition, the display device 100 may be flexible enough to be curved, bent, folded or rolled.

As shown in FIGS. 1 and 2, the display device 100 may include a substrate 110.

One surface of the substrate 110, which corresponds to a display surface of the display device 100, may include a display area DA disposed on most of a center, and a non-display area NDA disposed near the display area DA.

The display area DA may be formed as a rectangular plane having a pair of sides extended in a first direction DR1 and a pair of sides extended in a second direction DR2 crossing the first direction DR1. A corner where one side of the first direction DR1 meets one side of the second direction DR2 may be rounded to have a predetermined curvature, or may be formed at a right angle. A planar shape of the display area DA is not limited to a rectangular shape, and may be formed in another polygonal shape, a circular shape or an oval shape.

The non-display area NDA may surround the display area DA, and may be disposed at an edge of the substrate 110.

Referring to FIG. 2, the display device 100 according to the embodiments may include a substrate 110, a circuit layer 120 disposed on the substrate 110, and a touch sensor layer 150 disposed on the circuit layer 120.

The display device 100 according to embodiments may further include an element layer 130 disposed on the circuit layer 120, and a sealing layer 140 disposed on the element layer 130.

The display device 100 according to the embodiments may further include a polarizing layer 160 disposed on the touch sensor layer 150 to reduce reflection of external light.

Also, the display device 100 according to the embodiments may further include a cover window disposed on the polarizing layer 160.

The cover window may face the substrate 110, and may be coupled to a bracket disposed on a rear surface of the substrate 110.

The substrate 110 may be made of an insulating material such as a polymer resin. For example, the substrate 110 may be made of polyimide. The substrate 110 may be a flexible substrate capable of being subjected to bending, folding, rolling and the like.

Alternatively, the substrate 110 may be made of an insulating material such as glass.

The substrate 110 may include a display area DA and a non-display area NDA.

The circuit layer 120 may include conductive layers, one or more semiconductor layers, and insulating layers interposed therebetween. The circuit layer 120 may include transistors provided with one or more semiconductor layers and one or more conductive layers, and signal lines respectively provided with at least one of the conductive layers.

The element layer 130 may include light emitting elements that emit light in accordance with a driving current applied from the circuit layer 120.

The sealing layer 140 may encapsulate the circuit layer 120 and the element layer 130, and may block permeation of oxygen or moisture into the element layer 130.

The touch sensor layer 150 may be disposed on the sealing layer 140. The touch sensor layer 150 may include touch electrodes for sensing a point where a touch of a person or an object occurs on a display surface by detecting a signal varied depending on the touch of the person or the object.

Referring to FIG. 3, the display area DA of the substrate 110 of the display device 100 according to the embodiments may include light emission areas EA. In addition, the display area DA may further include a non-light emission area disposed at a spaced portion between the light emission areas EA.

The element layer (130 of FIG. 2) may include light emitting elements (LE of FIG. 4) disposed in the light emission areas EA, respectively.

The circuit layer (120 of FIG. 2) may include the emission pixel drivers EPD arranged in the display area DA in parallel with each other in the first direction DR1 and the second direction DR2. The emission pixel drivers EPD may be electrically connected to the light emitting elements (LE of FIG. 4) of the element layer (130 of FIG. 2), respectively.

The light emission areas EA may have a rhombus planar shape or a rectangular planar shape, but this is not an exhaustive list of possibilities. The planar shape of the light emission areas EA according to one embodiment is not limited to the shown example of FIG. 3. That is, the light emission areas EA may have a polygonal shape such as a rectangular shape, a pentagonal shape and a hexagonal shape, or may have a circular or oval planar shape including a curved edge.

The light emission areas EA may include first light emission areas EA1 for emitting light of a first color by a predetermined wavelength band, second light emission areas EA2 for emitting light of a second color by a wavelength band lower than that of the first color, and third light emission areas EA3 for emitting light of a third color by a wavelength band lower than that of the second color.

For example, the first color may be red by a wavelength band of 600 nm to 750 nm, approximately. The second color may be green by a wavelength band of 480 nm to 560 nm, approximately. The third color may be blue by a wavelength band of 370 nm to 460 nm, approximately.

The first light emission areas EA1 and the third light emission areas EA3 may be alternately arranged in at least one of the first direction DR1 or the second direction DR2.

The second light emission areas EA2 may be arranged in at least one of the first direction DR1 or the second direction DR2.

The second light emission areas EA2 may be adjacent to the first light emission areas EA1 and the third light emission areas EA3 in diagonal directions DR4 and DR5 crossing the first direction DR1 and the second direction DR2, either between a line of the first light emission areas EA1 and a line of the third light emission areas EA3 extending in the second direction DR2, or extending in the first direction DR1 between lines including alternating first and third emission areas EA1, EA3.

Pixels PX for displaying each luminance and color may be provided by the first light emission area EA1, the second light emission area EA2 and the third light emission area EA3, which are adjacent to one another as shown in FIG. 3, among the light emission areas EA.

In other words, the pixels PX may be basic units for displaying various colors including a white color at predetermined luminance.

Each of the pixels PX may include at least one first light emission area EA1, at least one second light emission area EA2 and at least one third light emission area EA3, which are adjacent to one another. Therefore, each pixel PX may display various colors through mixture of light emitted from the first light emission area EA1, the second light emission area EA2 and the third light emission area EA3, which are adjacent to one another.

Figure 4:
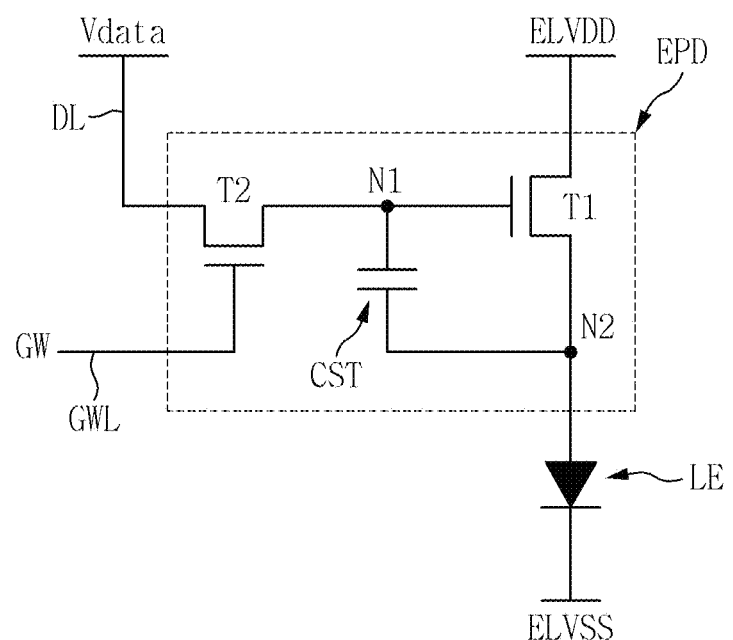
FIG. 4 is an equivalent circuit view illustrating an emission pixel driver of FIG. 3.

FIG. 4 is an equivalent circuit view illustrating the emission pixel driver of FIG. 3.

Referring to FIG. 4, one of the light emitting elements LE of the element layer (130 of FIG. 2) may be electrically connected between one of the emission pixel drivers (EPD of FIG. 3) of the circuit layer (120 of FIG. 2) and a second power source ELVSS.

That is, an anode electrode of the light emitting element LE may be electrically connected to the emission pixel driver EPD, and the second power source ELVSS having a voltage level lower than that of a first power source ELVDD may be applied to a cathode electrode of the light emitting element LE.

The circuit layer (120 of FIG. 2) may include a scan write line GWL for transferring a scan write signal GW, and a data line DL for transferring a data signal Vdata.

The emission pixel driver EPD may include a first transistor T1 generating a driving current for driving of the light emitting element LE, one or more transistors T2 electrically connected to the first transistor T1 or the light emitting element LE, and one or more capacitors CST.

For example, the emission pixel driver EPD may include a first transistor T1, a second transistor T2, and a storage capacitor CST.

The first transistor T1 may be electrically connected between the first power source ELVDD and the light emitting element LE.

The second transistor T2 may be electrically connected between the data line DL and a first node N1.

The second transistor T2 may be turned on by the scan write signal GW of the scan write line GWL.

The first node N1 may be electrically connected to a gate electrode of the first transistor T1. That is, the first transistor T1 may be turned on in accordance with a potential of the first node N1.

The storage capacitor CST may be electrically connected between the first node N1 and a second node N2.

The second node N2 may be electrically connected to a contact point between the first transistor T1 and the light emitting element LE.

The first power source ELVDD may be applied to a first electrode of the first transistor T1, and a second electrode of the first transistor T1 may be electrically connected to the storage capacitor CST and the light emitting element LE through a second node N2.

When the second transistor T2 is turned on in accordance with the scan write signal GW, the data signal Vdata of the data line DL may be transferred to the first node N1 through the turned-on second transistor T2.

Thus, a voltage difference between the gate electrode of the first transistor T1 and the first electrode of the first transistor T1 may correspond to a differential voltage between the first power source ELVDD and the data signal Vdata.

In this case, when a voltage difference between the gate electrode of the first transistor T1 and the first electrode of the first transistor T1, that is, a gate-source voltage difference is greater than or equal to a threshold voltage, the first transistor T1 may be turned on so that a drain-source current of the first transistor T1, which corresponds to the data signal Vdata, may be generated.

Therefore, the drain-source current of the first transistor T1, which corresponds to the data signal Vdata, may be supplied as the driving current of the light emitting element LE.

Thus, the light emitting element LE may emit light having luminance corresponding to the data signal Vdata.

In addition, the storage capacitor CST is filled with a voltage corresponding to the data signal Vdata of the data line DL through the turned-on second transistor T2, and the turned-on state of the first transistor T1 may be maintained by the filled voltage of the storage capacitor CST.

In the embodiment of FIG. 4, the first transistor T1 and the second transistor T2 may be provided as P-type MOSFET. However, this is just an example, and at least one of the first transistor T1 or the second transistor T2 may be provided as N-type MOSFET.

Figure 5:
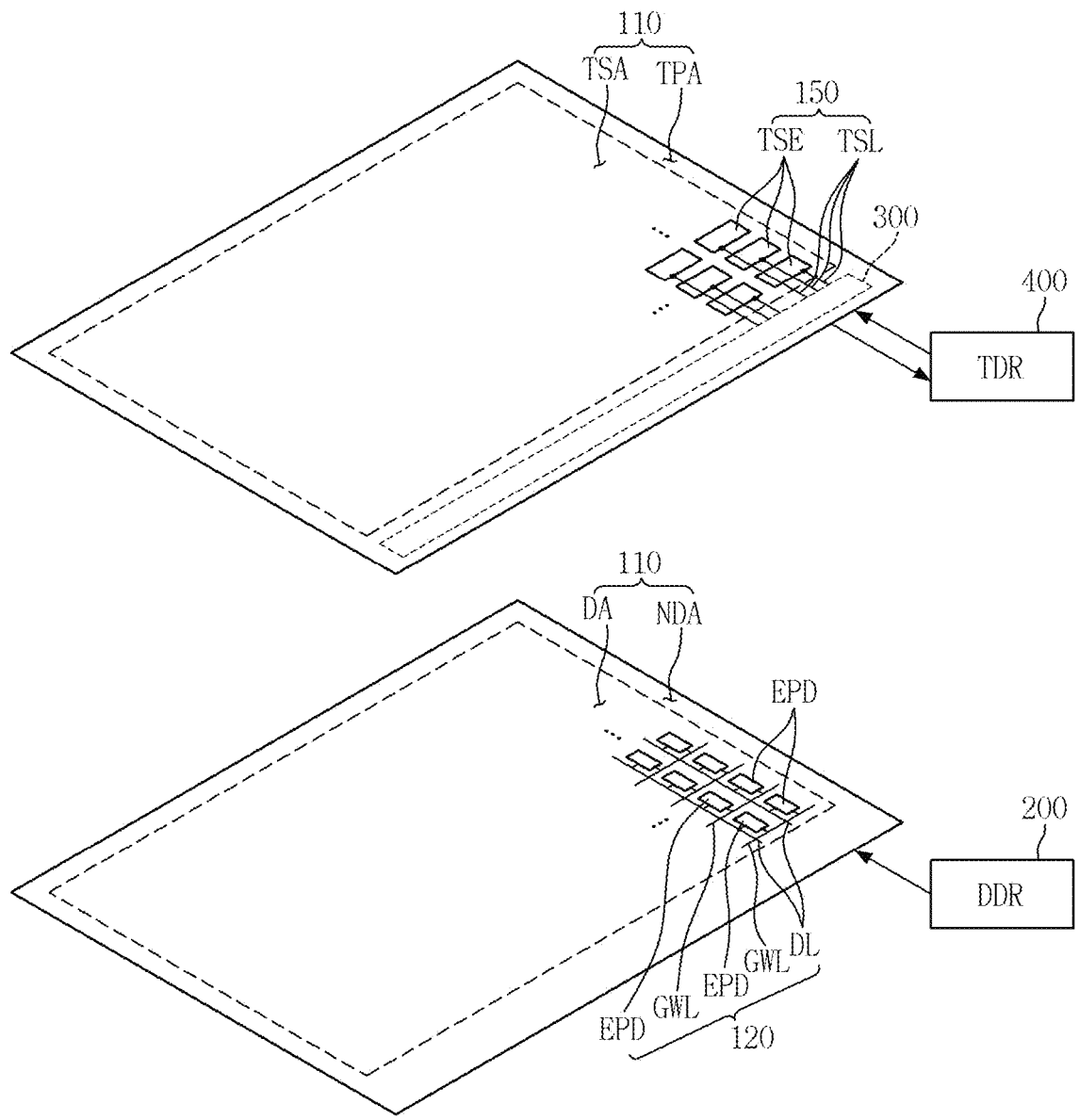
FIG. 5 is a schematic view illustrating a circuit layer and a touch sensor layer of FIG. 2.
Figure 6:
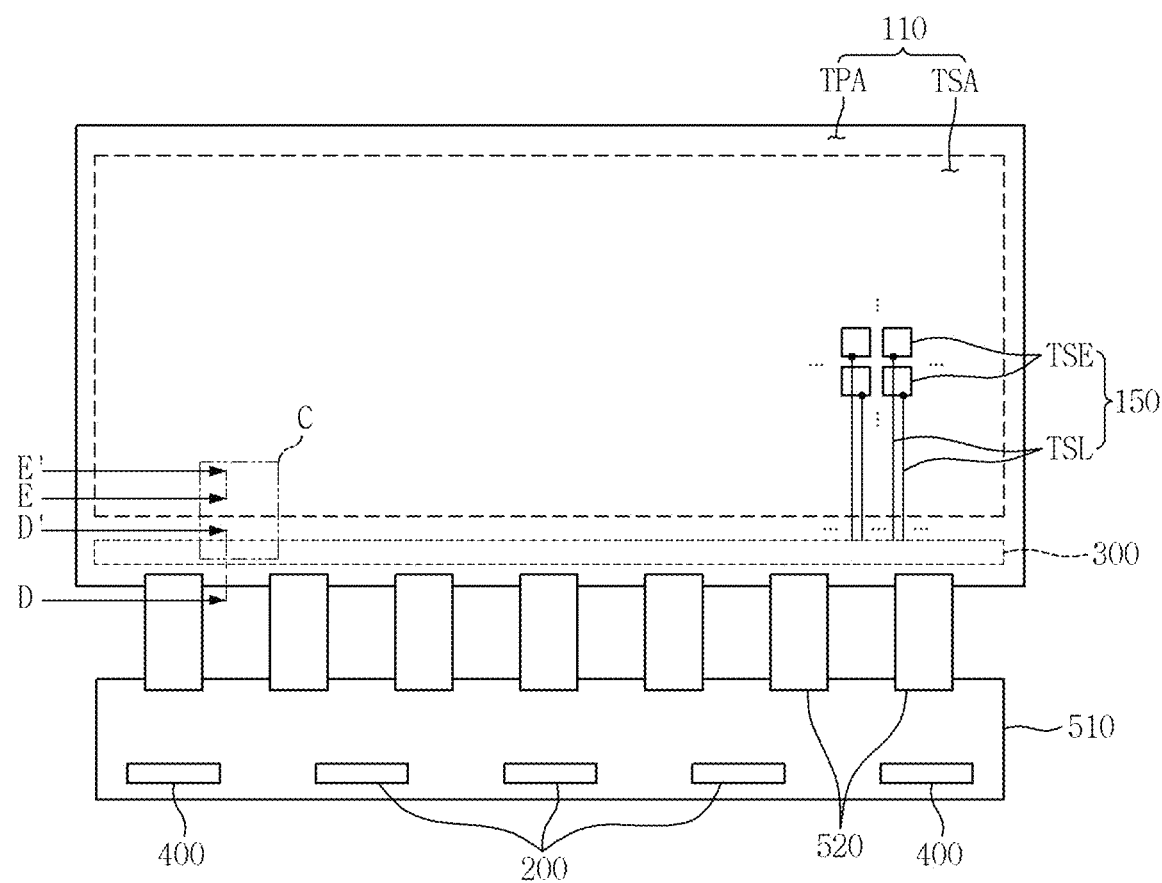
FIG. 6 is a plan view illustrating a touch sensor layer of FIG. 2.

FIG. 5 is a schematic view illustrating a circuit layer and a touch sensor layer of FIG. 2. FIG. 6 is a plan view illustrating the touch sensor layer of FIG. 2.

Referring to FIG. 5, the circuit layer 120 of the display device 100 according to the embodiments may include an emission pixel driver EPD arranged in the display area DA in the first direction DR1 and the second direction DR2, scan write lines GWL extended in the first direction DR1, and data lines DL extended in the second direction DR2.

According to the embodiments, the display device 100 may include a display driving circuit (DDR) 200 that supplies the data signal (Vdata of FIG. 4) to the data lines DL of the circuit layer 120.

Referring to FIGS. 5 and 6, the substrate 110 of the display device 100 according to the embodiments may include a touch sensing area TSA and a touch peripheral area TPA near the touch sensing area TSA.

The touch sensing area TSA may overlap the entire display area DA.

For example, a width of the touch sensing area TSA may be greater than or equal to that of the display area DA. That is, an edge of the touch sensing area TSA may overlap the non-display area NDA.

The touch peripheral area TPA may overlap the non-display area NDA.

The touch sensor layer 150 may include touch sensing electrodes TSE arranged in the touch sensing area TSA in parallel with each other in the first direction DR1 and the second direction DR2, and sensing transfer lines TSL electrically connected to the touch sensing electrodes TSE, respectively.

The display device 100 according to the embodiments may include a touch driving circuit (TDR) 400 for driving the touch sensing electrodes TSE.

As shown in FIGS. 5 and 6, according to the embodiments, each of the display driving circuit 200 and the touch driving circuit 400 may be provided as an integrated circuit (IC).

For example, the display device 100 may include a circuit board 510 on which the display driving circuit 200 and the touch driving circuit 400 are packaged, and flexible films 520 electrically connected between the circuit board 510 and the circuit layer (120 of FIG. 2).

For example, each of the display driving circuit 200 and the touch driving circuit 400 may be packaged on one of the substrate 110 and the flexible films 520.

The touch driving circuit 400 may individually supply a driving signal (Sdr of FIG. 7) to the touch sensing electrodes TSE or receive a sensing signal (Sse in FIG. 7) of each of the touch sensing electrodes TSE.

Since the sensing transfer lines TSL are electrically connected to the touch sensing electrodes TSE, respectively, the number of sensing transfer lines TSL may exceed the number of signal terminals of the touch driving circuit 400.

Therefore, the display device 100 according to the embodiments may include a multiplexer 300 electrically connected between the sensing transfer lines TSL and the touch driving circuit 400.

The multiplexer 300 may be disposed in the touch peripheral area TPA, and may select some of the sensing transfer lines TSL.

That is, some of the sensing transfer lines TSL, which are selected by the multiplexer 300, may be electrically connected to the touch driving circuit 400.

Figure 7:
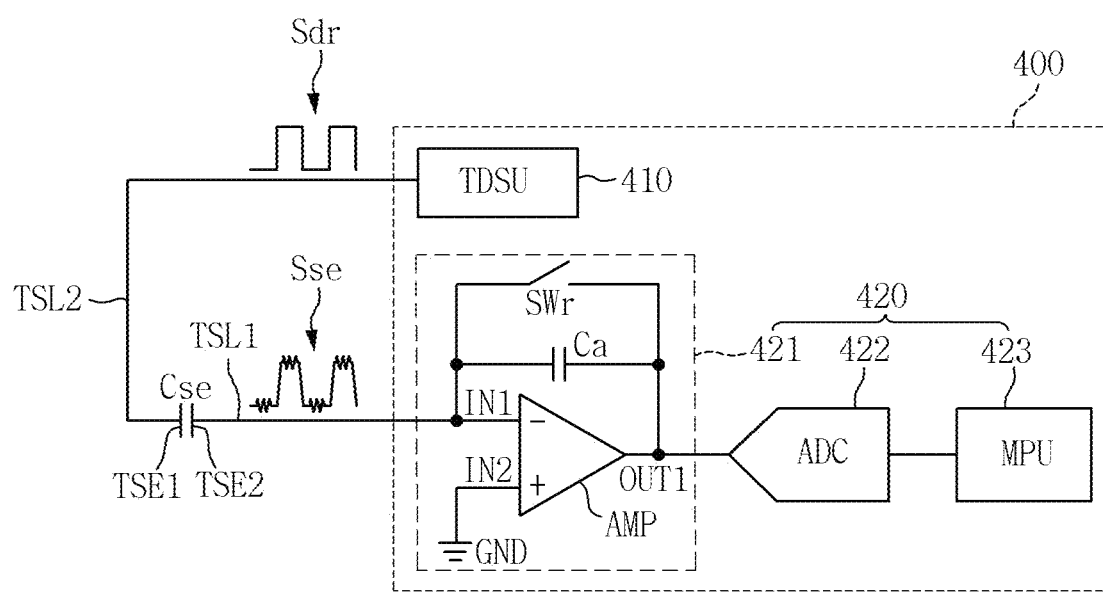
FIG. 7 is a block diagram illustrating a touch driving circuit of FIG. 6.

FIG. 7 is a block diagram illustrating the touch driving circuit of FIG. 6.

Referring to FIG. 7, the touch driving circuit 400 may include a driving signal supply unit 410 for supplying the driving signal Sdr of the touch sensing electrodes TSE, and a sensing signal receiving unit 420 for receiving the sensing signal Sse of the touch sensing electrodes TSE.

The driving signal supply unit 410 may periodically apply the driving signal Sdr to the touch sensing electrodes (TSE of FIG. 6) in sequence.

The sensing signal receiving unit 420 may periodically receive a sensing signal Sse corresponding to the mutual capacitance Cse between the touch sensing electrodes TSE1 and TSE2 from each of the at least one touch sensing electrode TSE2.

The sensing signal receiving unit 420 may include a signal amplifying unit 421 for amplifying the sensing signal Sse, an analog-to-digital converter 422 for converting the amplified sensing signal Sse from an analog state to a digital state, and a processor 423 for sensing a touch based on the sensing signal of the digital state.

The signal amplifying unit 421 may be an analog front end including an amplifier AMP.

The amplifier AMP may include a first input terminal IN1 and a second input terminal IN2, amplify a signal corresponding to a voltage difference between the first input terminal IN1 and the second input terminal IN2 and output the amplified signal to the output terminal OUT1.

The signal amplifying unit 421 may further include a capacitor Ca and a reset switch SWr, which are connected in parallel with the amplifier AMP.

Figure 8:
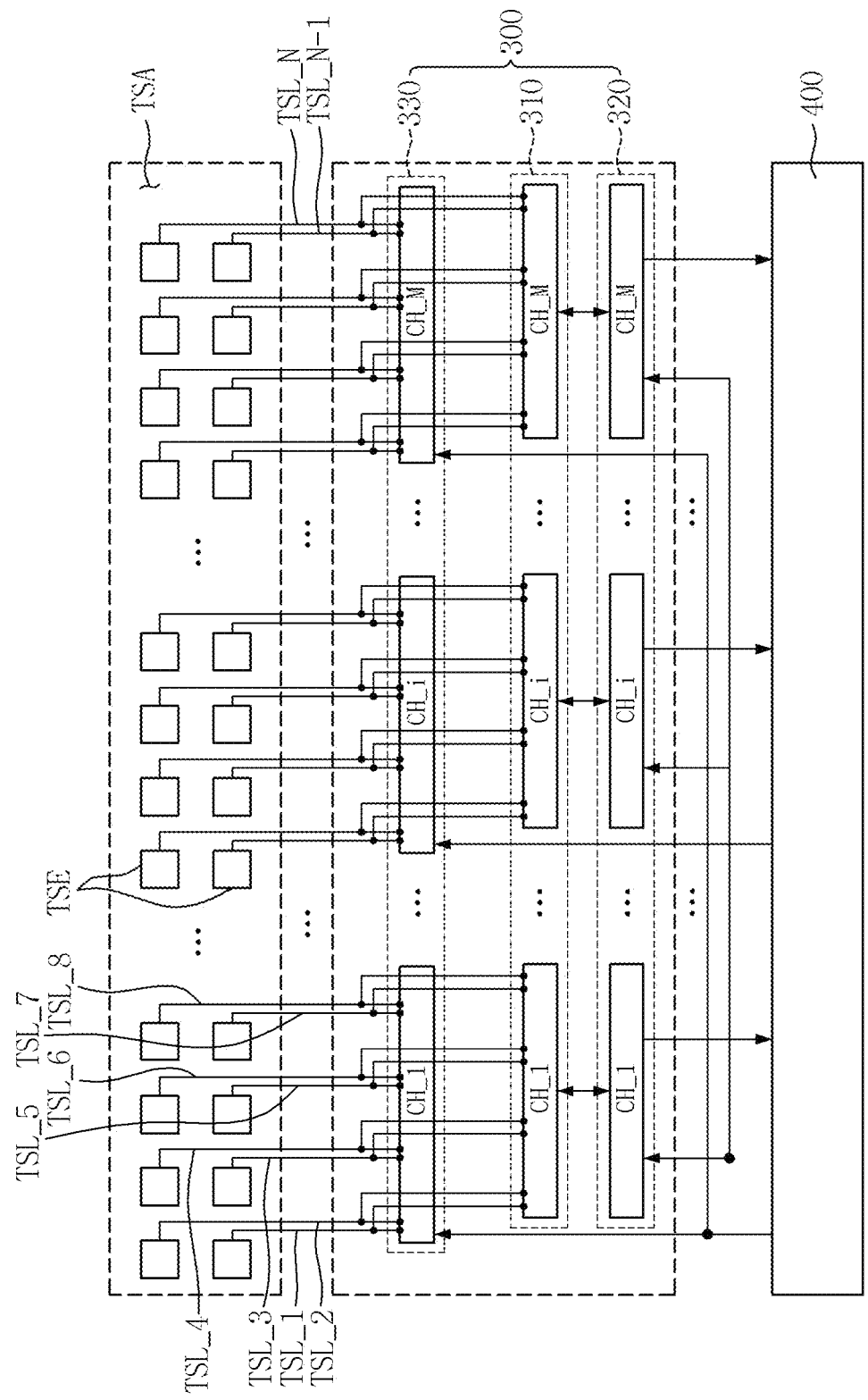
FIG. 8 is a block diagram illustrating a multiplexer of FIG. 6.

FIG. 8 is a block diagram illustrating the multiplexer of FIG. 6.

Referring to FIG. 8, the display device 100 according to the embodiments may include N number of sensing transfer lines TSL_1, TSL_2, TSL_N−1 and TSL_N (TSL of FIG. 6) electrically connected to N number of touch sensing electrodes TSE, respectively, and a multiplexer 300 electrically connected between the N number of sensing transfer lines TSL_1, TSL_2, TSL_N-1 and TSL_N and the touch driving circuit 400.

The multiplexer 300 may include a first MUX unit 310 for selecting a first set of M number of sensing transfer lines among the N number of sensing transfer lines TSL_1, TSL_2, TSL_N-1 and TSL_N, a second MUX unit 320 for transferring the sensing signal (Sse of FIG. 7) of a first subset of the first set of M number of sensing transfer lines that are selected by the first MUX unit 310, to the touch driving circuit 400, and a third MUX unit 330 for transferring the driving signal (Sdr of FIG. 7) to a second set of M number of sensing transfer lines of the N number of sensing transfer lines TSL_1, TSL_2, TSL_N-1 and TSL_N. As used herein, as "set" includes one or more. A "subset," similarly, includes one or more.

The second MUX unit 320 may transfer the driving signal (Sdr of FIG. 7) to the second subset of the first set of sensing transfer lines. The first subset and the second subset of the first set of sensing transfer lines are different, and may be mutually exclusive. The first set of sensing transfer lines and the second set of sensing transfer lines are different, and may be mutually exclusive.

Each of the first MUX unit 310, the second MUX unit 320 and the third MUX unit 330 may include M number of channels CH_1, CH_i and CH_M wherein i is any number between 1 and M.

The N number of sensing transfer lines TSL_1, TSL_2, TSL_N-1 and TSL_N may be divided into the M number of channels CH_1, CH_i and CH_M. That is, the M number of channels CH_1, CH_i and CH_M may be electrically connected to two or more different sensing transfer lines among the N number of sensing transfer lines TSL_1, TSL_2, TSL_N-1 and TSL_N.

Each of the M number of channels CH_1, CH_i and CH_M of the first MUX unit 310 may select one of the multiple sensing transfer lines electrically connected thereto. The sensing transfer lines that are selected by the first MUX unit 310 of the M channels are herein referred to as the "first set" of M sensing transfer lines.

The M number of channels CH_1, CH_i and CH_M of the second MUX unit 320 may be connected to the M number of channels CH_1, CH_i and CH_M of the first MUX unit 310 in a one-to-one manner.

The M number of channels CH_1, CH_i and CH_M of the second MUX unit 320 may select either a supply operation of the driving signal (Sdr of FIG. 7) or a reception operation of the sensing signal (Sse of FIG. 7), each of which is performed for each of the M number of sensing transfer lines selected by the first MUX unit 310. As used herein, a "first subset" of the first set of M sensing transfer lines are selected for the reception operation of the sensing signal, and the "second subset" of the first set of M sensing transfer liens are selected for the supply operation of the driving signal.

Each of the M number of channels CH_1, CH_i and CH_M of the third MUX unit 330 may select one of the multiple sensing transfer lines electrically connected thereto, and may perform the supply operation of the driving signal (Sdr of FIG. 7) for the selected one sensing transfer line. The sensing transfer lines selected by the third mU unit 330 are herein referred to as the "second set" of M sensing transfer lines.

In this way, the multiplexer 300 may select M number of sensing transfer lines among the N number of sensing transfer lines TSL_1, TSL_2, TSL_N-1 and TSL_N by the first MUX unit 310 and the second MUX unit 330 and select another M number of sensing transfer lines among the N number of sensing transfer lines TSL_1, TSL_2, TSL_N-1 and TSL_N by the third MUX unit 330, thereby selecting 2M number of sensing transfer lines to be electrically connected to the touch driving circuit 400.

In this case, each of N and M is a natural number, and 2M may be smaller than N. That is, M may be smaller than N.

Figure 9:
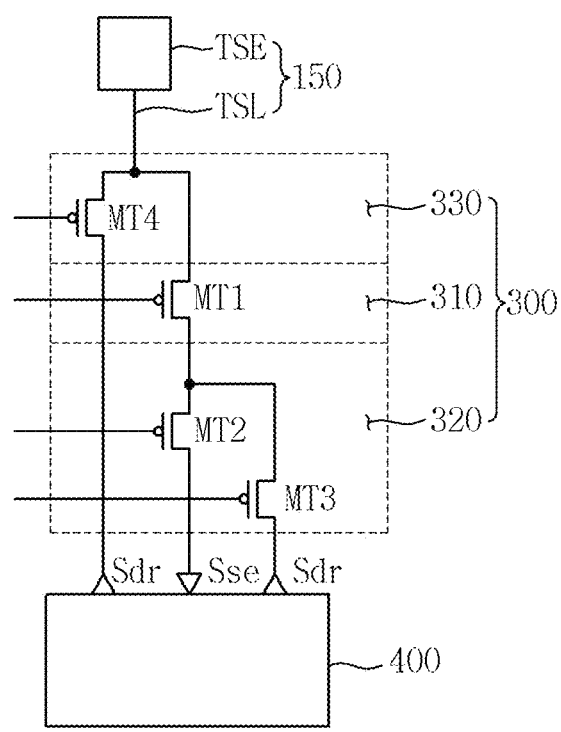
FIG. 9 is an equivalent circuit view illustrating electrical connection among one touch sensing electrode, a multiplexer and a touch driving circuit.

FIG. 9 is an equivalent circuit view illustrating electrical connection among one touch sensing electrode, a multiplexer and a touch driving circuit.

Referring to FIG. 9, one touch sensing electrode TSE may be electrically connected to one sensing transfer line TSL, and one sensing transfer line TSL may be electrically connected to the touch driving circuit 400 through the multiplexer 300.

The multiplexer 300 may include a first MUX unit 310, a second MUX unit 320 and a third MUX unit 330.

The first MUX unit 310 may include a first MUX transistor MT1 electrically connected to the sensing transfer line TSL.

The second MUX unit 320 may include a second MUX transistor MT2 and a third MUX transistor MT3, which are electrically connected between the first MUX transistor MT1 and the touch driving circuit 400.

The second MUX transistor MT2 may be electrically connected to the sensing signal receiving unit (420 of FIG. 7), which receives the sensing signal Sse, of the touch driving circuit 400.

That is, when the first MUX transistor MT1 and the second MUX transistor MT2 are turned on, the sensing signal Sse of the sensing transfer line TSL may be transferred to the touch driving circuit 400.

The third MUX transistor MT3 may be electrically connected to the driving signal supply unit (410 of FIG. 7), which supplies the driving signal Sdr, of the touch driving circuit 400.

That is, when the first MUX transistor MT1 and the third MUX transistor MT3 are turned on, the driving signal Sdr may be applied to the sensing transfer line TSL.

The third MUX unit 330 may include a fourth MUX transistor MT4 electrically connected between the sensing transfer line TSL and the touch driving circuit 400.

The fourth MUX transistor MT4 may be electrically connected to the driving signal supply unit (410 of FIG. 7), which supplies the driving signal Sdr, of the touch driving circuit 400.

That is, when the fourth MUX transistor MT4 is turned on, the driving signal Sdr may be applied to the sensing transfer line TSL.

As described above, the display device 100 according to the embodiments includes a multiplexer 300 that selectively connects 2M number of sensing transfer lines of the N number of sensing transfer lines TSL to the touch driving circuit 400. Therefore, even though the N number of sensing transfer lines TSL connected to the N number of touch sensing electrodes TSE in a one-to-one manner are provided, as the 2M number of sensing transfer lines selected by the multiplexer 300 are electrically connected to the touch driving circuit 400, the number of signal terminals provided in the touch driving circuit 400 may be 2M, not N.

Therefore, since the number of touch driving circuits 400 does not need to be increased due to the N number of sensing transfer lines TSL, the manufacturing cost of the display device 100 may be prevented from being significantly increased.

Meanwhile, the multiplexer 300 may include a large number of MUX transistors MT to select some of the N number of sensing transfer lines TSL and to select an operation for each of the selected sensing transfer lines. For example, the first MUX unit 310 and the third MUX unit 330 may include N number of first MUX transistors MT1 and N number of fourth MUX transistors MT4, which are electrically connected to the N number of sensing transfer lines TSL, respectively. In addition, the second MUX unit 320 may include M number of second MUX transistors MT2 and M number of third MUX transistors MT3, which are electrically connected to M number of channels of the first MUX unit 310.

In this way, as the multiplexer 300 includes a relatively large number of MUX transistors MT, static electricity may easily flow into and be concentrated on the multiplexer 300. Also, for easy placement of the MUX transistors MT, the multiplexer 300 is disposed in an area of the touch peripheral area TPA, which is adjacent to the edge of the substrate 110, so that a large amount of static electricity may easily flow into the multiplexer 300. In addition, as the multiplexer 300 is frequently exposed to a large amount of static electricity, the MUX transistors MT and lines connected thereto are damaged, whereby reliability and lifespan of the multiplexer 300 may be reduced.

Thus, hereinafter, embodiments with reduced concentration of static electricity with respect to the multiplexer 300 will be provided.

Figure 10:
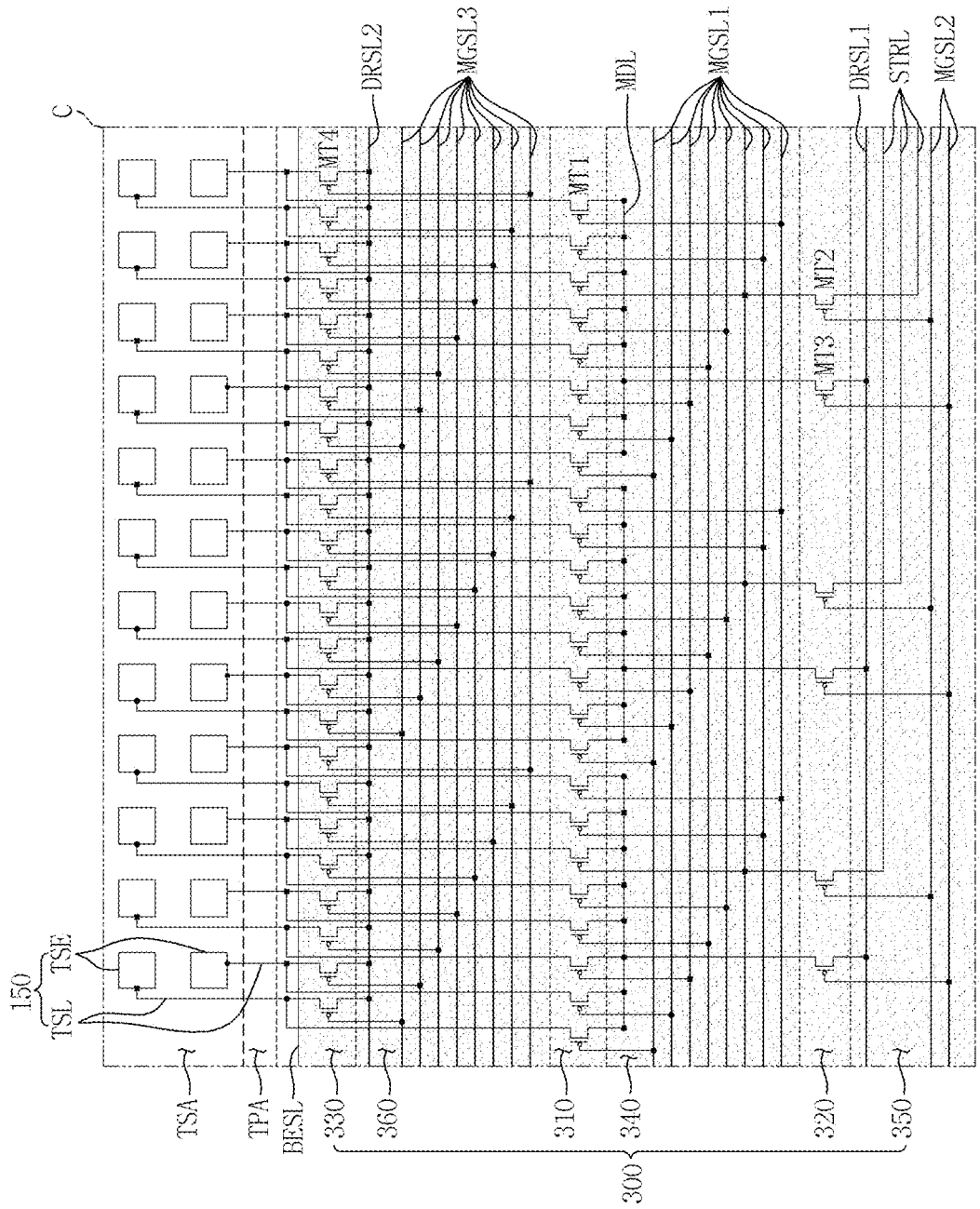
FIG. 10 is a schematic view illustrating a portion C of FIG. 6 according to the embodiments.
Figure 11:
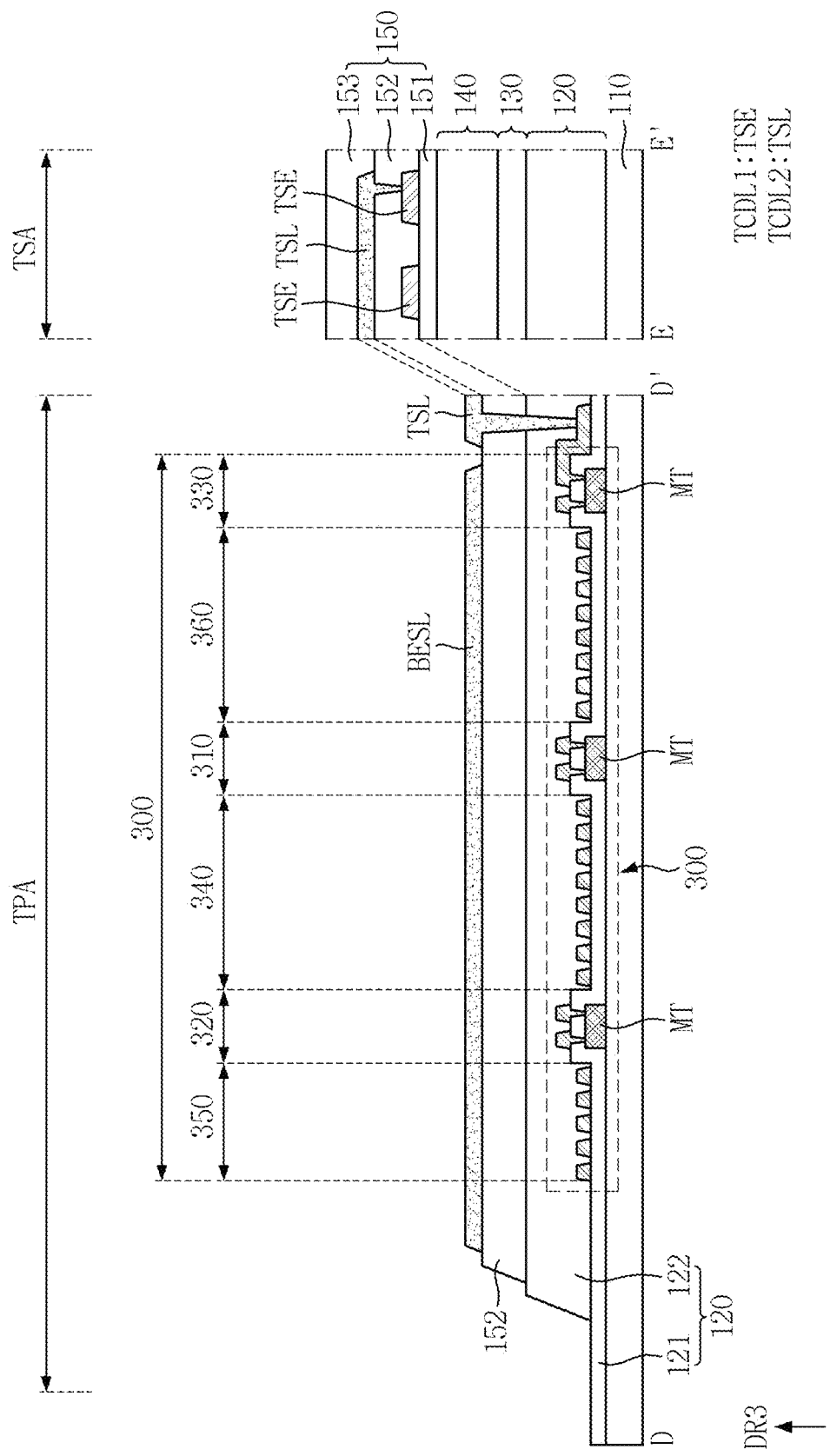
FIG. 11 is a cross-sectional view illustrating D-D' and E-E' of FIG. 6 according to one embodiment.

FIG. 10 is a schematic view illustrating a portion C of FIG. 6 according to the embodiments. FIG. 11 is a cross-sectional view illustrating D-D' and E-E' of FIG. 6 according to one embodiment.

Referring to FIGS. 10 and 11, the display device 100 according to the embodiments may include an electrostatic shielding layer BESL that overlaps the multiplexer 300.

In this way, the static electricity around the multiplexer 300 may be prevented from flowing into the multiplexer 300 by the electrostatic shielding layer BESL that overlaps the multiplexer 300.

According to the embodiments, the multiplexer 300 includes a first MUX unit 310 including N number of first MUX transistors MT1 electrically connected to N number of sensing transfer lines TSL, a second MUX unit 320 including M number of second MUX transistors MT2 and M number of third MUX transistors MT3, which are electrically connected to M number of channels of the first MUX unit 310, a third MUX unit 320 including N number of fourth MUX transistors MT4 electrically connected to the N number of sensing transfer lines TSL, a first line portion 340 including lines MDL and MGSL1 electrically connected to the N number of first MUX transistors MT1 of the first MUX unit 310 and arranged to be adjacent to each other, a second line portion 350 including lines DRSL1, STRL and MGSL2 electrically connected to the M number of second MUX transistors MT2 and the M number of third MUX transistors MT3, and a third line portion 360 including lines DRSL2 and MGSL3 electrically connected to the N number of fourth MUX transistors MT4 of the third line portion 360.

The first line portion 340 may include middle lines MDL and first MUX gate supply lines MGSL1.

Each of the M number of channels (CH_1, CH_i and CH_m of FIG. 8) of the first MUX unit 310 may include two or more first MUX transistors MT1.

In each of the M number of channels (CH_1, CH_i and CH_m of FIG. 8) of the first MUX unit 310, two or more first MUX transistors MT1 may be electrically connected to two or more sensing transfer lines, respectively, and may be electrically connected to one of the middle lines MDL.

In each of the M number of channels (CH_1, CH_i and CH_m of FIG. 8) of the first MUX unit 310, gate electrodes of two or more first MUX transistors MT1 may be electrically connected to two or more different lines of the first MUX gate supply lines MGSL1.

The second line portion 350 may include a first driving signal supply line DRSL1, sensing signal transfer lines STRL and second MUX gate supply lines MGSL2.

Each of the M number of channels (CH_1, CH_i and CH_m of FIG. 8) of the second MUX unit 320 may include one second MUX transistor MT2 and one third MUX transistor MT3.

In each of the M number of channels (CH_1, CH_i and CH_m of FIG. 8) of the second MUX unit 320, the second MUX transistor MT2 may be electrically connected to the middle line MDL of each of the M number of channels (CH_1, CH_i and CH_m of FIG. 8) of the first MUX unit 310, and may be electrically connected to one of the sensing signal transfer lines STRL.

In each of the M number of channels (CH_1, CH_i and CH_m of FIG. 8) of the second MUX unit 320, the third MUX transistor MT3 may be electrically connected to the middle line MDL of each of the M number of channels (CH_1, CH_i and CH_m of FIG. 8) of the first MUX unit 310, and may be electrically connected to the first driving signal supply line DRSL1.

In each of the M number of channels (CH_1, CH_i and CH_m of FIG. 8) of the second MUX unit 320, a gate electrode of the second MUX transistor MT2 and a gate electrode of the third MUX transistor MT3 may be electrically connected to two different second MUX gate supply lines MGSL2.

The third line portion 360 may include a second driving signal supply line DRSL2 and third MUX gate supply lines MGSL3.

Each of the M number of channels (CH_1, CH_i and CH_m of FIG. 8) of the third MUX unit 330 may include two or more fourth MUX transistors MT4.

In each of the M number of channels (CH_1, CH_i and CH_m of FIG. 8) of the third MUX unit 330, the two or more fourth MUX transistors MT4 may be electrically connected to the two or more sensing transfer lines, respectively, and may be electrically connected to the second driving signal supply line DRSL2.

In each of the M number of channels (CH_1, CH_i and CH_m of FIG. 8) of the third MUX unit 330, gate electrodes of the two or more fourth MUX transistors MT4 may be electrically connected to two or more different third MUX gate supply lines MGSL3.

Referring to FIG. 11, the circuit layer 120 of the display device 100 according to the embodiments may include an interlayer insulating layer 121 disposed on the substrate 110, and a planarization layer 122 covering a source drain conductive layer on the interlayer insulating layer 121.

The interlayer insulating layer 121 may cover the MUX transistors MT of the multiplexer 300.

The MUX transistors MT1 include N number of MUX transistors (MT1 of FIG. 10) of the first MUX unit 310, M number of second MUX transistors (MT2 of FIG. 10) and M number of third MUX transistors (MT3 of FIG. 10) of the second MUX unit 320, and N number of fourth MUX transistors (MT4 of FIG. 10) of the third MUX unit 330.

In addition, the lines (MDL, MGSL1, DRSL1, STRL, MGSL2, DRSL2 and MGSL3 of FIG. 10) of the first line portion (340 of FIG. 10), the second line portion (350 of FIG. 10) and the third line portion (360 of FIG. 10) of the multiplexer 300 may be disposed as source drain conductive layers on the interlayer insulating layer 121.

The touch sensor layer 150 of the display device 100 according to the embodiments may include a touch buffer layer 151 disposed on the circuit layer 120, a first touch conductive layer TCDL1 disposed on the touch buffer layer 151, a touch interlayer insulating layer 152 covering the first touch conductive layer TCDL1, a second touch conductive layer TCDL2 disposed on the touch interlayer insulating layer 152, and a touch planarization layer 153 covering the second touch conductive layer TCDL2.

The N number of touch sensing electrodes TSE arranged in the touch sensing area TSA may be disposed as the first touch conductive layer TCDL1.

The N number of sensing transfer lines TSL electrically connected to the N number of touch sensing electrodes TSE, respectively, may be disposed as the second touch conductive layers TCDL2.

The embodiments are just examples, and at least some of the N number of sensing transfer lines TSL may be disposed on the same layer as the N number of touch sensing electrodes TSE.

According to the embodiments, the electrostatic shielding layer BESL may be disposed as the second touch conductive layer TCDL2 on the touch interlayer insulating layer 152.

According to one embodiment of FIG. 11, the electrostatic shielding layer BESL may be disposed on the touch interlayer insulating layer 152, and may overlap the multiplexer 300.

Therefore, since the static electricity flowing from the upper side of the display device 100 may be shielded from the multiplexer 300 by the electrostatic shielding layer BESL, damage to the multiplexer 300 due to the inflow and concentration of the static electricity may be avoided.

FIGS. 12, 13, 14, 15 and 16 are cross-sectional views illustrating D-D' of FIG. 6 according to the embodiments.

Figure 12:
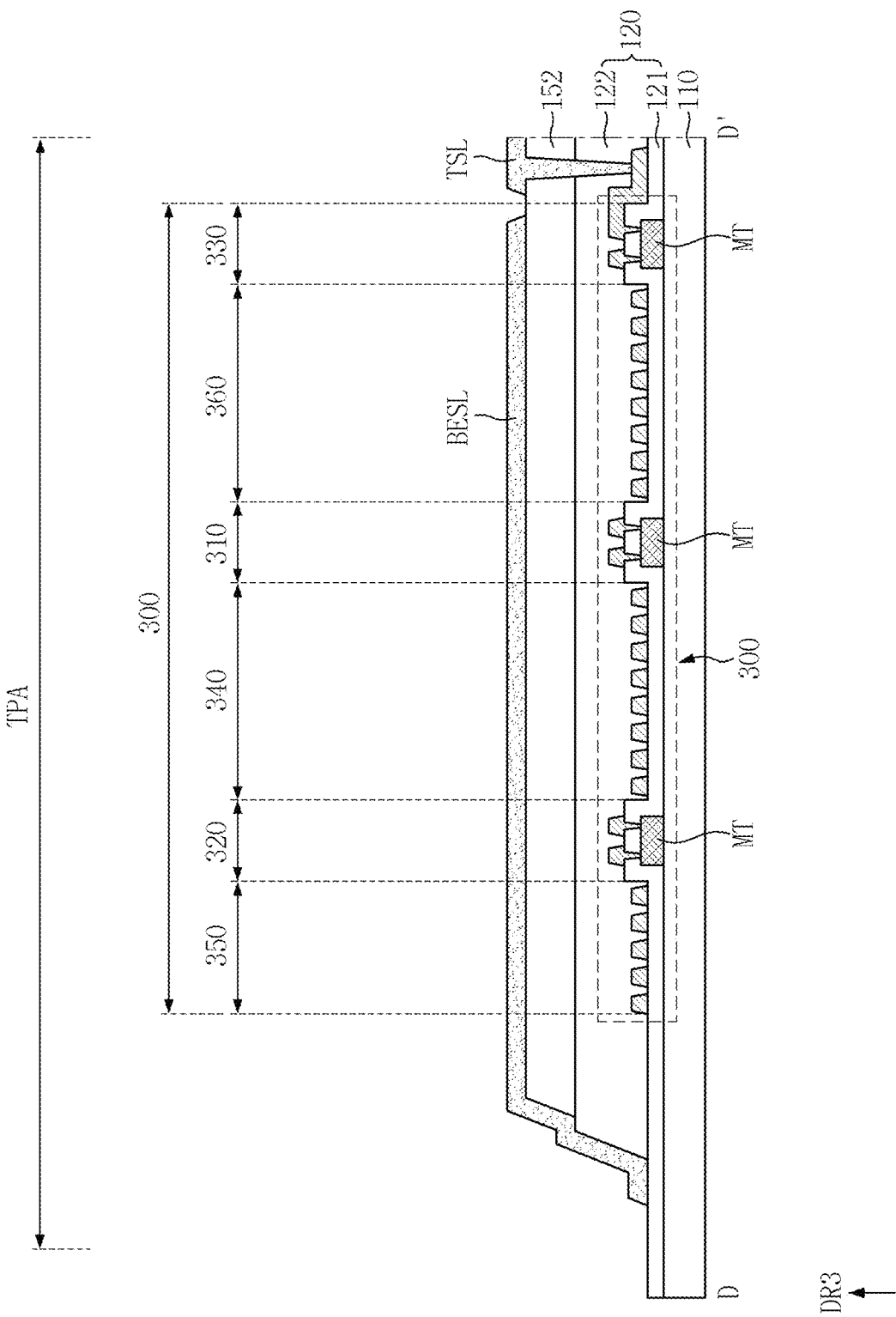
FIGS. 12, 13, 14, 15 and 16 are cross-sectional views illustrating D-D' of FIG. 6 according to the embodiments.

The display device 100 according to the embodiment shown in FIG. 12, is substantially the same as one embodiment of FIG. 11 except that the electrostatic shielding layer BESL extends toward the edge of the substrate 110 and covers a side of each of the touch interlayer insulating layer 152 and the planarization layer 122 and is in contact with the interlayer insulating layer 121. Thus, any redundant description will be omitted below.

In this case, the static electricity flowing from the side as well as the upper side of the display device 100 may be shielded from the multiplexer 300 by the electrostatic shielding layer BESL. Therefore, damage to the multiplexer 300 due to inflow and concentration of static electricity may be further avoided.

Figure 13:
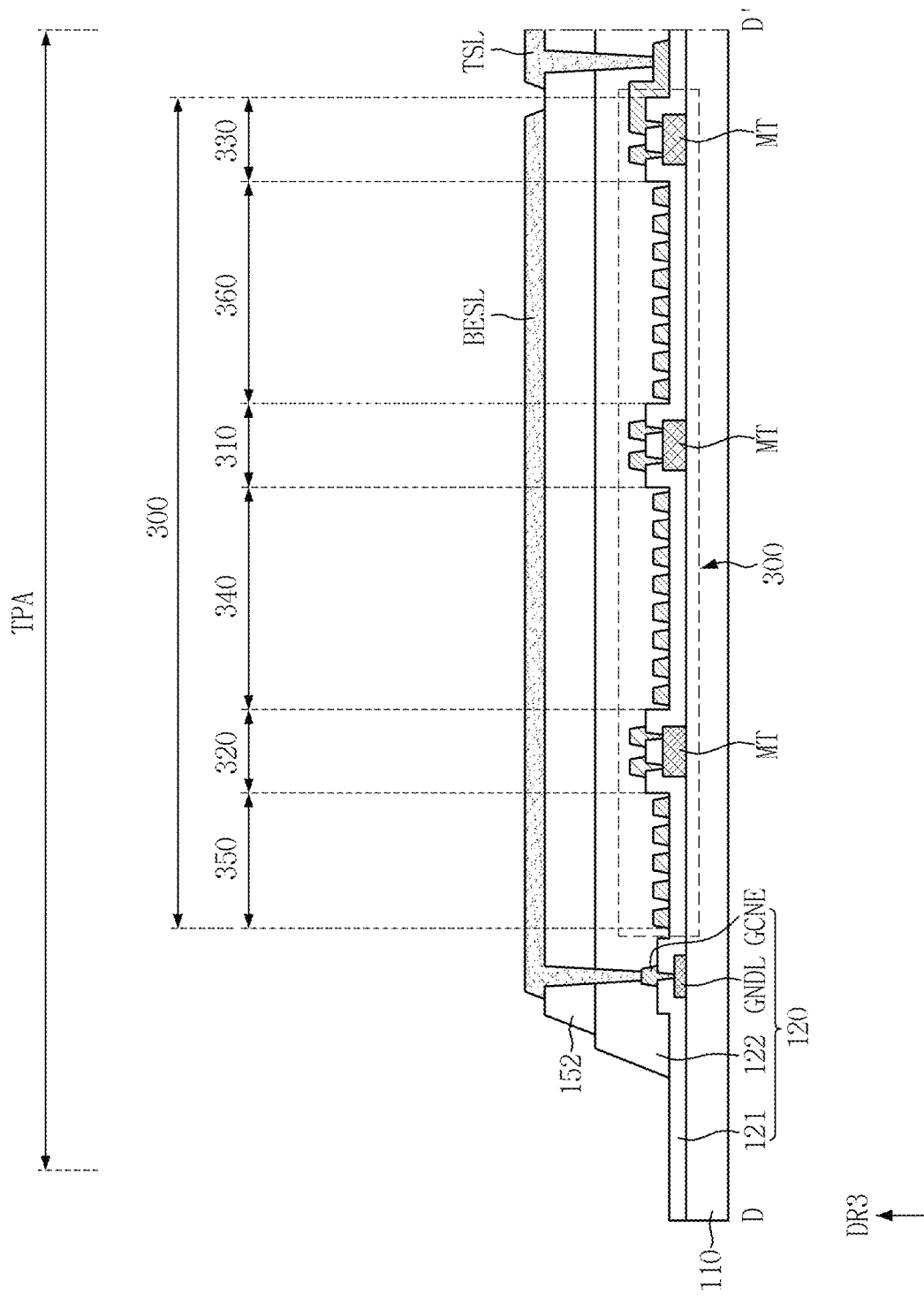

The display device 100 according to the embodiment shown in FIG. 13 is substantially the same as one embodiment of FIG. 11 except that the electrostatic shielding layer BESL is electrically connected to a ground line GNDL for transferring a ground power source. Thus, any redundant description will be omitted below.

Figure 14:
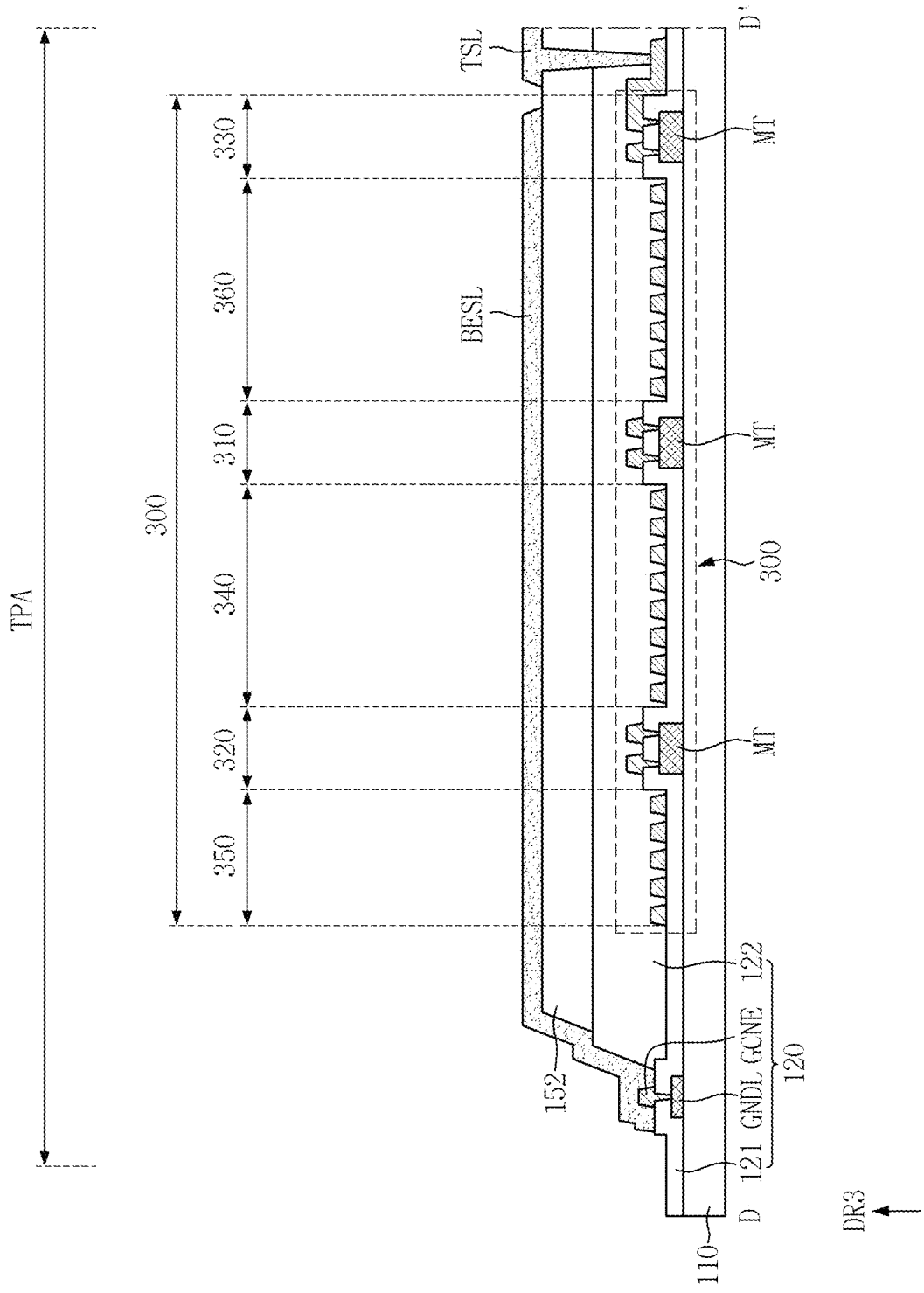

The display device 100 according to the embodiment shown in FIG. 14 is substantially the same as one embodiment of FIG. 12 except that the electrostatic shielding layer BESL is electrically connected to the ground line GNDL for transferring a ground power source. Thus, its redundant description will be omitted below.

According to the embodiments shown in FIGS. 13 and 14, the circuit layer 120 may further include a ground line GNDL for transferring a ground power source.

The interlayer insulating layer 121 may further cover the ground line GNDL.

The circuit layer 120 may further include a ground connection electrode GCNE disposed as a source drain conductive layer on the interlayer insulating layer 121.

The ground connection electrode GCNE may overlap the ground line GNDL and the electrostatic shielding layer BESL. That is, the ground connection electrode GCNE may be disposed between the ground line GNDL and the electrostatic shielding layer BESL.

The ground connection electrode GCNE may be electrically connected to the ground line GNDL through a hole passing through the interlayer insulating layer 121.

In addition, the ground connection electrode GCNE may be electrically connected to the electrostatic shielding layer BESL through a hole passing through the planarization layer 122 and the touch interlayer insulating layer 152.

Thus, the electrostatic shielding layer BESL may be electrically connected to the ground line GNDL through the ground connection electrode GCNE.

In this way, since the static electricity flowing into the electrostatic shielding layer BESL may be discharged through the ground line GNDL, damage and error operation of the multiplexer 300 due to static electricity flowing into the electrostatic shielding layer BESL may be avoided.

Figure 15:
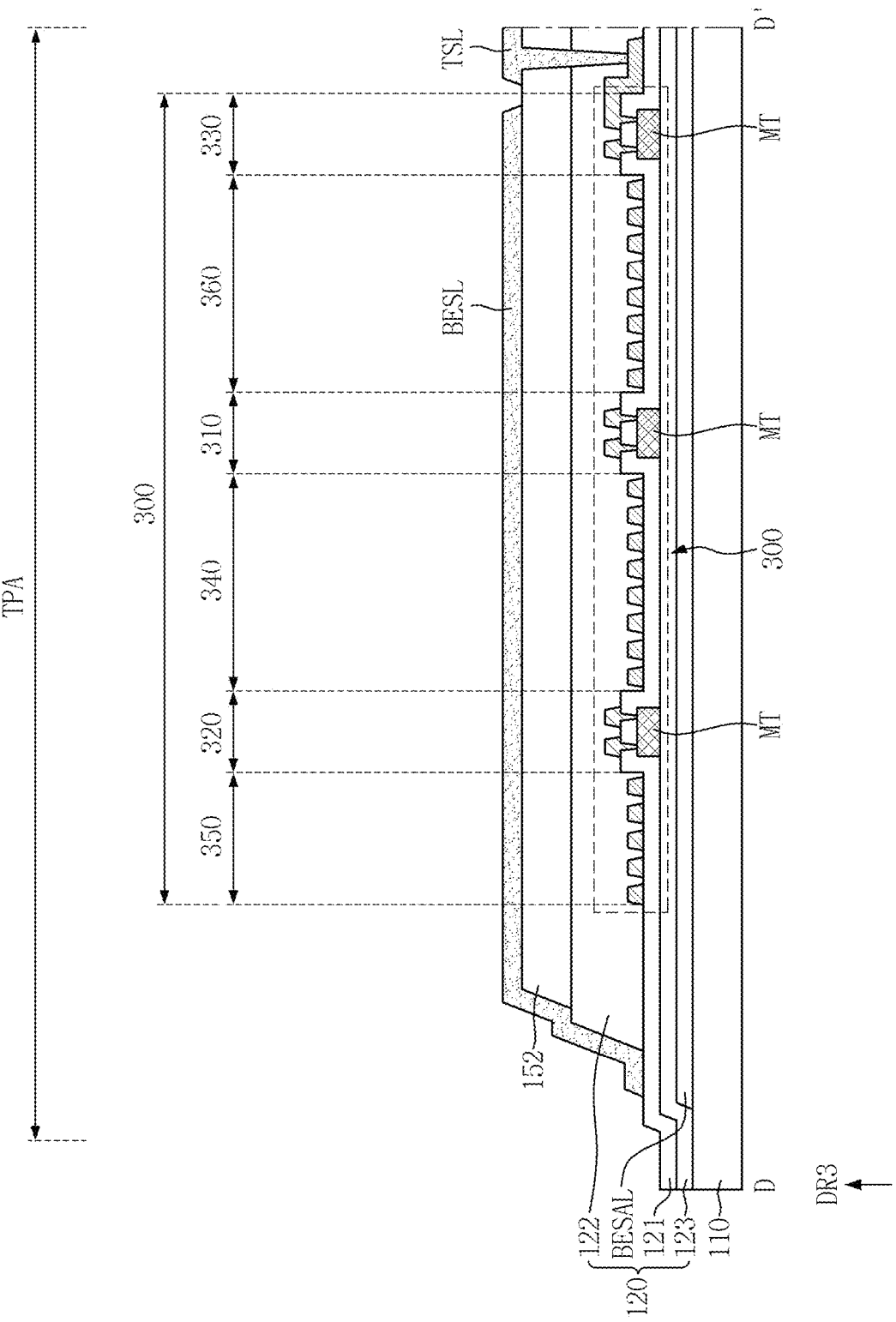

The display device 100 according to one embodiment, which is shown in FIG. 15, is substantially the same as one embodiment of FIG. 12 except that the circuit layer 120 further includes an electrostatic shielding auxiliary layer BESAL disposed on the substrate 110 and a buffer layer 123 covering the electrostatic shielding auxiliary layer BESAL, and thus its redundant description will be omitted below.

Figure 16:
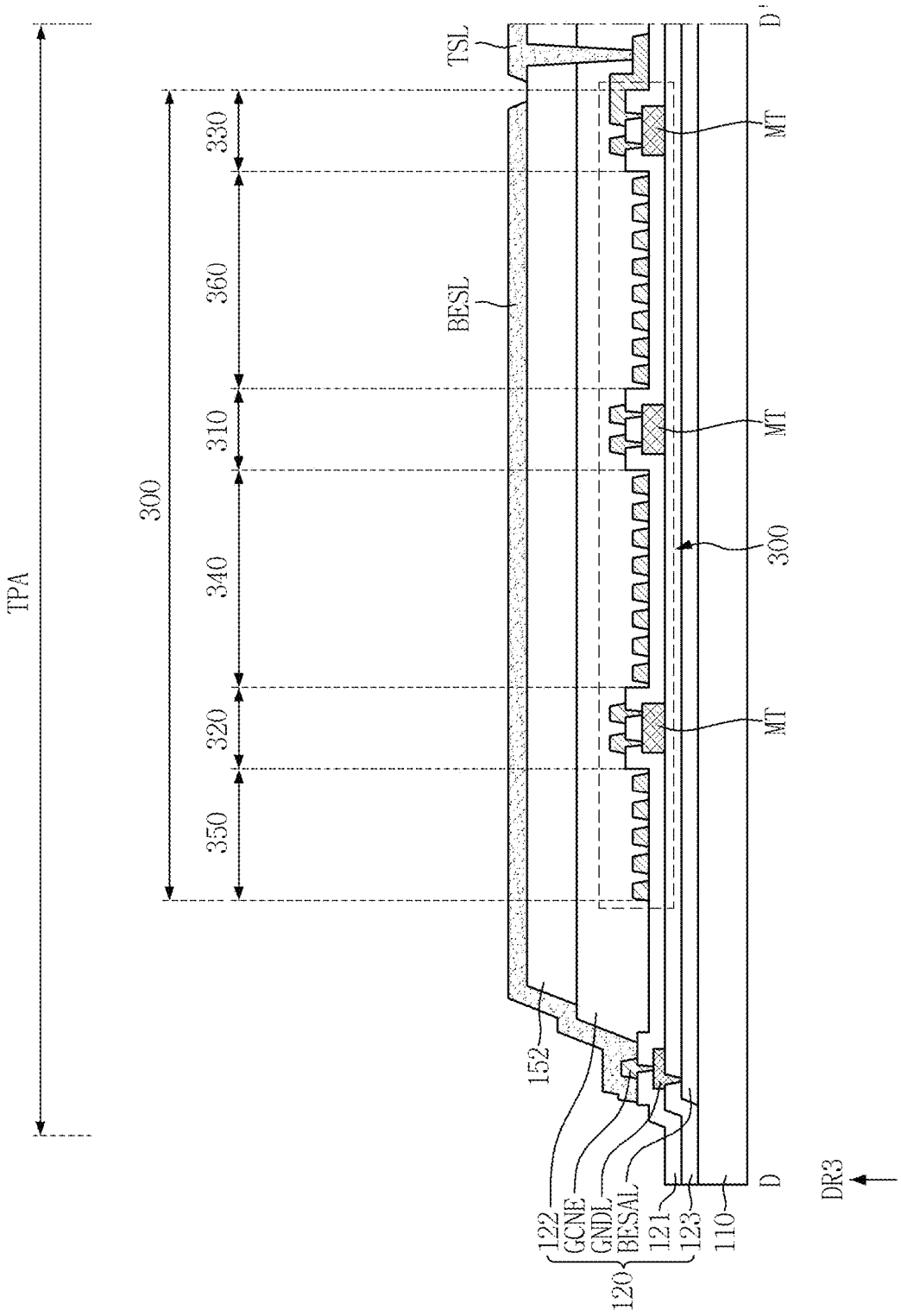

The display device 100 according to the embodiment shown in FIG. 16 is substantially the same as one embodiment of FIG. 14 except that the circuit layer 120 further includes an electrostatic shielding auxiliary layer BESAL disposed on the substrate 110 and a buffer layer 123 covering the electrostatic shielding auxiliary layer BESAL and the electrostatic shielding auxiliary layer BESAL is electrically connected to the ground line GNDL. Thus, any redundant description will be omitted below.

According to the embodiments shown in FIG. 15 and FIG. 16, the interlayer insulating layer 121 may be disposed on the buffer layer 123. That is, the interlayer insulating layer 121 may cover the MUX transistors MT of the multiplexer 300 disposed on the buffer layer 123.

In this case, since the static electricity flowing from the lower side of the display device 100 may be shielded from the multiplexer 300 by the static electricity shielding auxiliary layer BESAL, damage to the multiplexer 300 due to the inflow and concentration of the static electricity may be further avoided.

Figure 17:
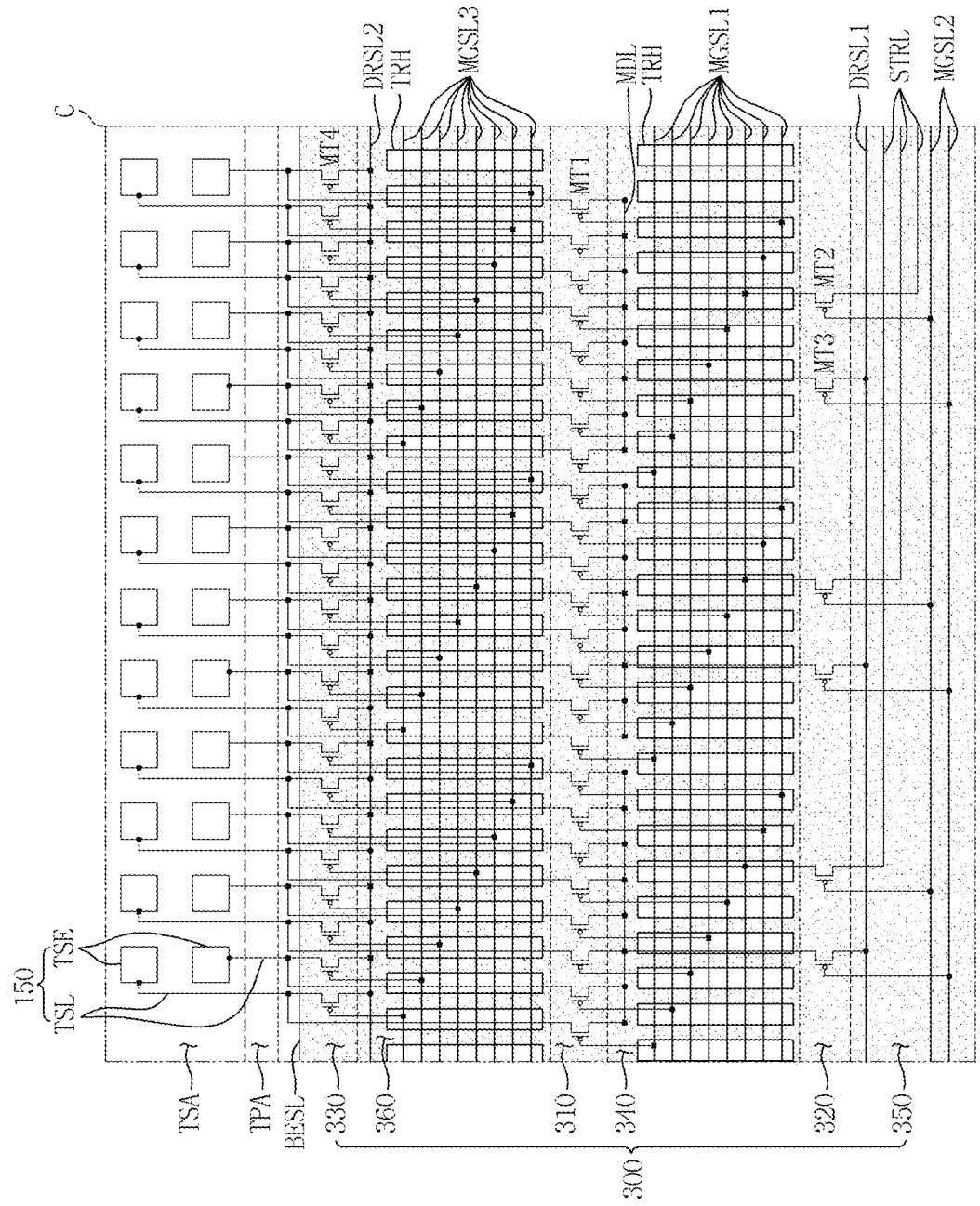
FIG. 17 is a schematic view illustrating a portion C of FIG. 6 according to another embodiment.
Figure 18:
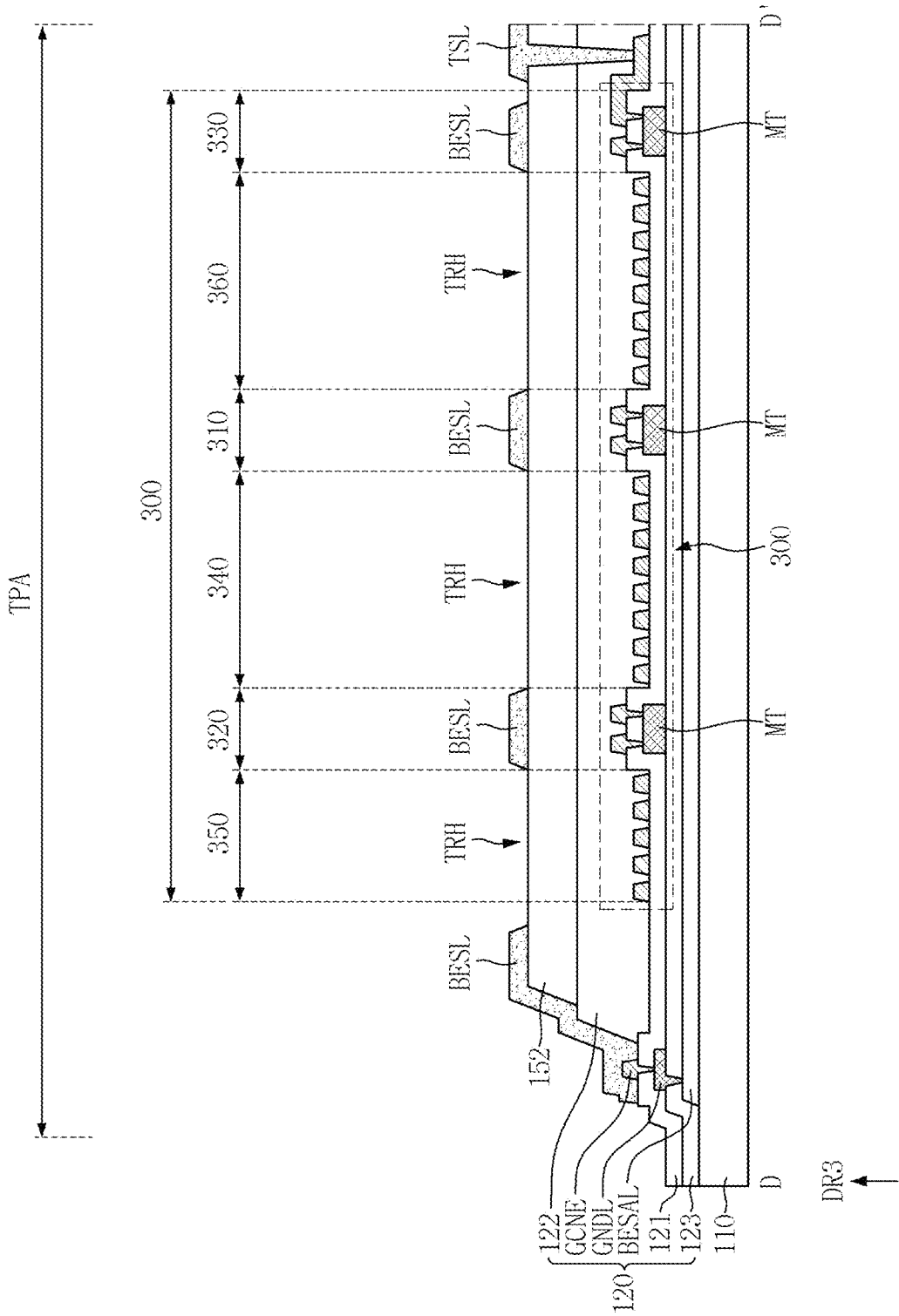
FIG. 18 is a cross-sectional view illustrating D-D' of FIG. 6 according to another embodiment.

FIG. 17 is a schematic view illustrating a portion C of FIG. 6 according to another embodiment. FIG. 18 is a cross-sectional view illustrating D-D' of FIG. 6 according to another embodiment.

Referring to FIGS. 17 and 18, the display device 100 according to one embodiment is substantially the same as the embodiments of FIGS. 10 to 16 except that it further includes transmissive holes TRH passing through the electrostatic shielding layer BESL and exposing the touch interlayer insulating layer 152, and thus its redundant description will be omitted below.

As shown in FIG. 17, the transmissive holes TRH may overlap the first line portion 340, the second line portion 350 and the third line portion 360.

For example, the transmissive holes TRH may be arranged in parallel with each other in the first direction DR1 or the second direction DR2.

Since the touch interlayer insulating layer 152 is exposed through the transmissive hole TRH, gas of an organic insulating material included in the touch interlayer insulating layer 152 or the planarization layer 122 may be relatively easily discharged through the transmissive hole TRH. Therefore, a gap defect of the electrostatic shielding layer BESL due to the gas of the organic insulating material may be avoided.

In addition, the transmissive holes TRH may be spaced apart from N number of first MUX transistors MT1, M number of second MUX transistors MT2, M number of third MUX transistors MT3 and N number of fourth MUX transistors MT4. In other words, the MUX transistors MT of the multiplexer 300 may overlap the electrostatic shielding layer BESL regardless of the transmissive holes TRH. Therefore, damage to the MUX transistors MT due to the static electricity may be reduced regardless of the transmissive holes TRH.

The effects of the present disclosure are not restricted to the one set forth herein. The above and other effects of the present disclosure will become more apparent to one of ordinary skill in the art to which the present disclosure pertains by referencing the claims.

What is claimed is:

1. A display device comprising:
    a substrate including a touch sensing area and a touch peripheral area disposed near the touch sensing area;
    a circuit layer disposed on the substrate;
    a touch sensor layer disposed on the circuit layer, including N number of touch sensing electrodes arranged in the touch sensing area in a first direction and a second direction, and N number of sensing transfer lines electrically connected to the N number of touch sensing electrodes, respectively;
    a multiplexer disposed in the touch peripheral area and electrically connected between the N number of sensing transfer lines and a touch driving circuit; and
    an electrostatic shielding layer overlapping with the multiplexer,
    wherein the N number of sensing transfer lines extend from the N number of touch sensing electrodes to the multiplexer,
    among the N number of sensing transfer lines, 2M number of sensing transfer lines selected by the multiplexer are electrically connected to the touch driving circuit, and
    each of N and M is a natural number and M is smaller than N.

2. The display device of claim 1, wherein the multiplexer includes:
    a first MUX unit for selecting a first set of M sensing transfer lines among the N sensing transfer lines;
    a second MUX unit for transferring a sensing signal of a first subset of the first set of M sensing transfer lines selected by the first MUX unit to the touch driving circuit; and
    a third MUX unit for transferring a driving signal to a second set of M sensing transfer lines among the N sensing transfer lines, wherein the first set and the second set of M sensing transfer lines are different; and
    the second MUX unit transfers the driving signal to a second subset of the first set of sensing transfer lines.

3. The display device of claim 2, wherein each of the first MUX unit, the second MUX unit and the third MUX unit includes M number of channels, and
    the M number of channels select mutually exclusive sensing transfer lines of the N number of sensing transfer lines.

4. The display device of claim 2, wherein the first MUX unit includes N number of first MUX transistors electrically connected to the N number of sensing transfer lines, respectively,
    the second MUX unit includes M number of second MUX transistors and M number of third MUX transistors, which are electrically connected to M number of sensing transfer lines selected by the first MUX unit,
    the third MUX unit includes N number of fourth MUX transistors electrically connected to the N number of sensing transfer lines, respectively, and
    the multiplexer further includes:
    a first line portion including lines electrically connected to the N number of first MUX transistors and arranged to be adjacent to each other;
    a second line portion including lines electrically connected to the M number of second MUX transistors and the M number of third MUX transistors and arranged to be adjacent to each other; and
    a third line portion including lines electrically connected to the N number of third MUX transistors and arranged to be adjacent to each other.

5. The display device of claim 4, wherein the touch sensor layer includes:
    a touch buffer layer disposed on the circuit layer;
    a first touch conductive layer disposed on the touch buffer layer;
    a touch interlayer insulating layer covering the first touch conductive layer;
    a second touch conductive layer disposed on the touch interlayer insulating layer; and
    a touch planarization layer covering the second touch conductive layer, and
    the electrostatic shielding layer is disposed as the second touch conductive layer on the touch interlayer insulating layer.

6. The display device of claim 5, wherein the N number of touch sensing electrodes are disposed as the first touch conductive layer and spaced apart from each other, and
    the N number of sensing transfer lines are disposed as the second touch conductive layer and spaced apart from each other.

7. The display device of claim 5, wherein the circuit layer includes:
    an interlayer insulating layer disposed on the substrate; and
    a planarization layer covering a source drain conductive layer on the interlayer insulating layer, and
    the interlayer insulating layer covers the N number of first MUX transistors, the M number of second MUX transistors, the M number of third MUX transistors and the N number of fourth MUX transistors, and
    the lines of each of the first line portion, the second line portion and the third line portion are disposed as the source drain conductive layer.

8. The display device of claim 7, wherein the electrostatic shielding layer extends toward an edge of the substrate, covers a side of each of the touch interlayer insulating layer and the planarization layer, and is in contact with the interlayer insulating layer.

9. The display device of claim 7, wherein the circuit layer further includes a ground line disposed to be adjacent to an edge of the substrate, transferring a ground power source, and
    the electrostatic shielding layer is electrically connected to the ground line.

10. The display device of claim 9, wherein the electrostatic shielding layer extends toward the edge of the substrate, covers a side of each of the touch interlayer insulating layer and the planarization layer, and is in contact with the interlayer insulating layer.

11. The display device of claim 9, wherein the circuit layer further includes a ground connection electrode overlapping with the ground line and the electrostatic shielding layer and disposed as the source drain conductive layer, and
the ground connection electrode is electrically connected to the ground line through a hole in the interlayer insulating layer, and is electrically connected to the electrostatic shielding layer through a hole extending through the planarization layer and the touch interlayer insulating layer.

12. The display device of claim 7, wherein the circuit layer further includes:
an electrostatic shielding auxiliary layer disposed on the substrate and overlapping with the multiplexer and the electrostatic shielding layer; and
a buffer layer covering the electrostatic shielding auxiliary layer, and
wherein the interlayer insulating layer is disposed on the buffer layer.

13. The display device of claim 12, wherein the electrostatic shielding layer extends toward an edge of the substrate, covers a side of each of the touch interlayer insulating layer and the planarization layer, and is in contact with the interlayer insulating layer.

14. The display device of claim 13, wherein the circuit layer further includes a ground line disposed to be adjacent to the edge of the substrate, transferring a ground power source, and the electrostatic shielding layer is electrically connected to the ground line.

15. The display device of claim 7, further comprising transmissive holes extending through the electrostatic shielding layer to the touch interlayer insulating layer,
wherein the transmissive holes overlap the first line portion, the second line portion and the third line portion, and are spaced apart from the N number of first MUX transistors, the M number of second MUX transistors, the M number of third MUX transistors and the N number of fourth MUX transistors.

16. A display device comprising:
a substrate including a touch sensing area and a touch peripheral area disposed near the touch sensing area;
a circuit layer disposed on the substrate;
a touch sensor layer disposed on the circuit layer, including N number of touch sensing electrodes arranged in the touch sensing area in a first direction and a second direction, and N number of sensing transfer lines electrically connected to the N number of touch sensing electrodes, respectively;
a multiplexer disposed in the touch peripheral area and electrically connecting the N number of sensing transfer lines to a touch driving circuit; and
an electrostatic shielding layer overlapping with the multiplexer,
wherein the N number of sensing transfer lines extend from the N number of touch sensing electrodes to the multiplexer,
among the N number of sensing transfer lines, 2M number of sensing transfer lines selected by the multiplexer are electrically connected to the touch driving circuit,
each of N and M is a natural number and M is smaller than N, the touch sensor layer includes:
a touch buffer layer disposed on the circuit layer;
a first touch conductive layer disposed on the touch buffer layer;
a touch interlayer insulating layer covering the first touch conductive layer;
a second touch conductive layer disposed on the touch interlayer insulating layer; and
a touch planarization layer covering the second touch conductive layer,
wherein the electrostatic shielding layer is disposed as the second touch conductive layer on the touch interlayer insulating layer.

17. The display device of claim 16, wherein the multiplexer includes:
a first MUX unit including N MUX transistors electrically connected to the N sensing transfer lines, respectively, and selecting a first set of M number of sensing transfer lines among the N number of sensing transfer lines;
a second MUX unit including 2M number of MUX transistors electrically connected to the first set of M number of sensing transfer lines and transferring a sensing signal of a first subset of the first set of sensing transfer lines to the touch driving circuit;
a third MUX unit including N number of MUX transistors electrically connected to the N number of sensing transfer lines, respectively, and transferring a driving signal to a second set of M number of sensing transfer lines among the N sensing transfer lines;
a first line portion including lines electrically connected to the N number of MUX transistors of the first MUX unit and arranged to be adjacent to each other;
a second line portion including lines electrically connected to the 2M number of MUX transistors of the second MUX unit and arranged to be adjacent to each other; and
a third line portion including lines electrically connected to the N number of MUX transistors of the third MUX unit and arranged to be adjacent to each other,
wherein the second MUX unit transfers the driving signal to a second subset of the first set of sensing transfer lines.

18. The display device of claim 17, wherein the circuit layer includes:
an interlayer insulating layer disposed on the substrate; and
a planarization layer covering a source drain conductive layer on the interlayer insulating layer, and
the interlayer insulating layer covers the MUX transistors of the multiplexer,
the lines of each of the first line portion, the second line portion and the third line portion are disposed as the source drain conductive layer, and
the electrostatic shielding layer extends toward an edge of the substrate, covers a side of each of the touch interlayer insulating layer and the planarization layer, and contacts the interlayer insulating layer.

19. The display device of claim 18, wherein the circuit layer further includes a ground line disposed to be adjacent to the edge of the substrate, transferring a ground power source, and the electrostatic shielding layer is electrically connected to the ground line.

20. The display device of claim 19, wherein the circuit layer further includes:
an electrostatic shielding auxiliary layer disposed on the substrate and overlapping with the multiplexer and the electrostatic shielding layer; and a buffer layer covering the electrostatic shielding auxiliary layer, wherein the interlayer insulating layer is disposed on the buffer layer, and wherein the electrostatic shielding auxiliary layer is electrically connected to the ground line.

* * * * *